US012580004B2

(12) United States Patent
Inaba

(10) Patent No.: US 12,580,004 B2
(45) Date of Patent: Mar. 17, 2026

(54) VIDEO EDITING SUPPORT DEVICE, VIDEO EDITING SUPPORT METHOD, AND RECORDING MEDIUM

(71) Applicant: ASICS CORPORATION, Kobe (JP)

(72) Inventor: Ryuichiro Inaba, Kobe (JP)

(73) Assignee: ASICS CORPORATION, Kobe (JP)

( * ) Notice: Subject to any disclaimer, the term of this patent is extended or adjusted under 35 U.S.C. 154(b) by 0 days.

(21) Appl. No.: 18/678,895

(22) Filed: May 30, 2024

(65) Prior Publication Data

US 2024/0404564 A1     Dec. 5, 2024

(30) Foreign Application Priority Data

May 31, 2023 (JP) ................................ 2023-089858
Oct. 25, 2023 (JP) ................................ 2023-183448

(51) Int. Cl.
*G11B 27/34* (2006.01)
*G06V 20/40* (2022.01)
*G11B 27/031* (2006.01)

(52) U.S. Cl.
CPC .............. *G11B 27/34* (2013.01); *G06V 20/42* (2022.01); *G06V 20/44* (2022.01); *G11B 27/031* (2013.01)

(58) Field of Classification Search
CPC ...... G11B 27/34; G11B 27/031; G06V 20/42; G06V 20/44
See application file for complete search history.

(56) References Cited

U.S. PATENT DOCUMENTS

2010/0310231 A1* 12/2010 Abe ........................ H04N 5/783
                                                          386/E9.011
2015/0375117 A1* 12/2015 Thompson .............. A63F 13/79
                                                          463/9
2018/0343442 A1* 11/2018 Yoshikawa .......... H04N 21/438
2019/0267041 A1*  8/2019 Ricciardi ......... H04N 21/23418

FOREIGN PATENT DOCUMENTS

JP          2020-095634 A      6/2020

* cited by examiner

*Primary Examiner* — Thai Q Tran
*Assistant Examiner* — Jose M Mesa
(74) *Attorney, Agent, or Firm* — Studebaker Brackett PLLC

(57) ABSTRACT

A video editing support device includes: a captured video acquirer that acquires a captured video capturing a state of a sport being played, in which the captured video includes an object as a subject; a stock video storage unit that stores a stock video based on the captured video; a condition storage unit that stores multiple attention mark assignment conditions for the object; an attention scene detector that detects an attention scene that satisfies an attention mark assignment condition in the stock video; an attention mark assignment unit that relates, to a detected attention scene, an attention mark corresponding to the type of an attention mark assignment condition associated with the detection; and a stock video display controller that displays the stock video on a certain display device and that displays, on the stock video, an attention mark related to an attention scene in the stock video, together with playback time information.

18 Claims, 18 Drawing Sheets

300

320

340

351

312

350

1

FIG. 17A                   FIG. 17B
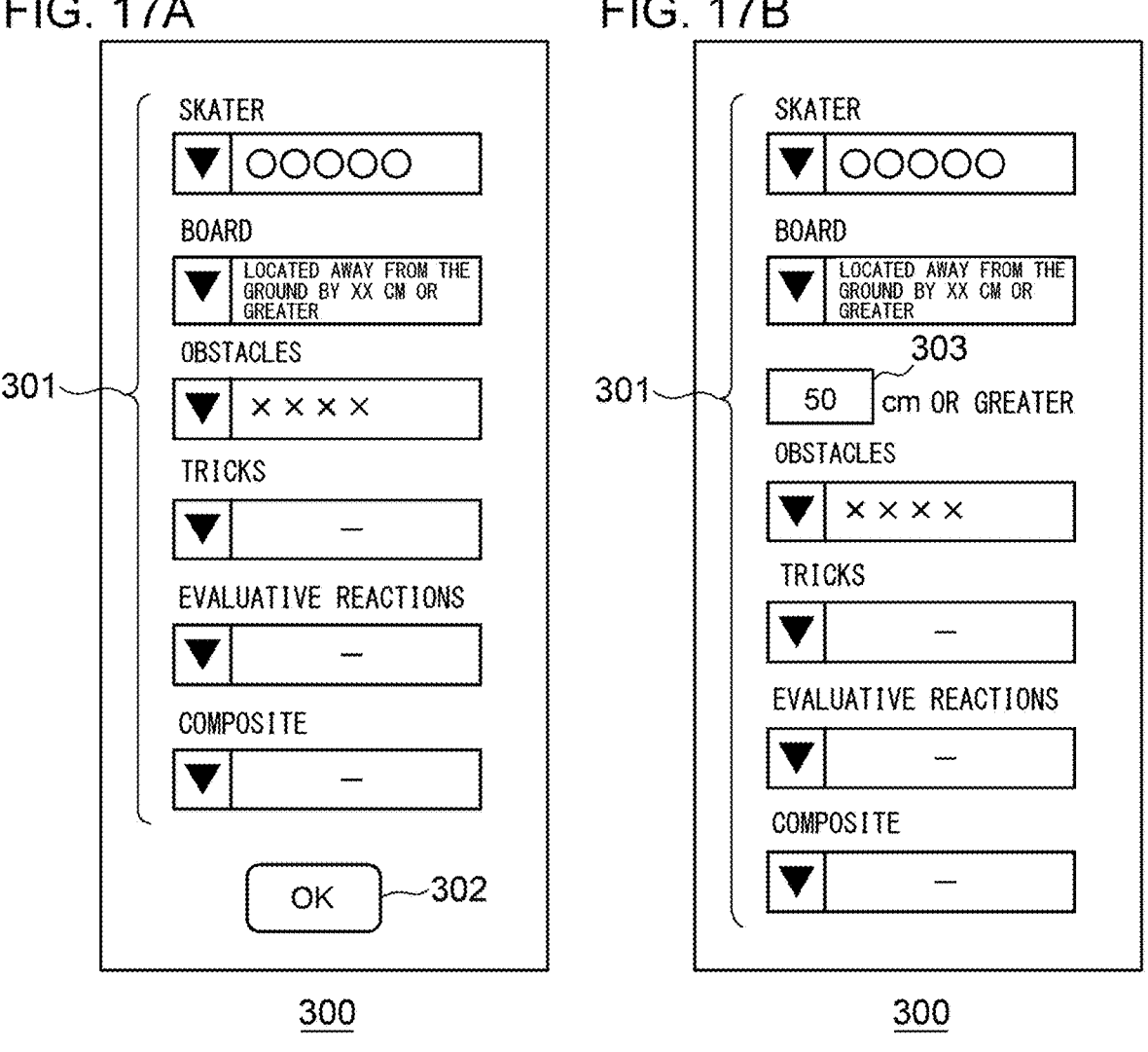

CONDITION 1

▼   SKATER

CONDITION 2

▼   SKATER

CONDITION 3

▼   BOARD ( NEXT )

300

SKATER

▼   KNEES ARE MOST BENT

SKATER

▼   JUMPING ○○ CM OR
    GREATER FROM THE GROUND

BOARD

▼   LOCATED FARTHEST FROM
    THE GROUND ( NEXT )

300

1

VIDEO EDITING SUPPORT DEVICE, VIDEO EDITING SUPPORT METHOD, AND RECORDING MEDIUM

REFERENCE TO RELATED APPLICATIONS

This application is based upon and claims the benefit of priority from the prior Japanese Patent Application No. 2023-089858 filed on May 31, 2023 and Japanese Patent Application No. 2023-183448 filed on Oct. 25, 2023, the entire contents of which are incorporated herein by reference.

BACKGROUND

1. Technical Field

The present disclosure relates to a video editing support device, a video editing support method, and a recording medium.

2. Background Information

Patent Literature 1 discloses an information processing device that supports editing of videos of a user's actions, such as dancing. The information processing device posts an edited video on social media, for example.

Patent Literature 1: Japanese Unexamined Patent Application Publication No. 2020-095634

SUMMARY

In the world of sports, videos of performances are often shot and posted on social media to be shared with friends and the general public. If many positive reviews can be obtained for a posted video, for example, it will be a motivation to continue practicing.

When a person posts a video on social media, the person may often want to or need to edit the video. At present, however, there have not been enough proposals for technologies that support editing of videos capturing states of sports being played.

The present disclosure has been made in view of such a situation, and an illustrative purpose of one embodiment of the present disclosure is to provide a technology that supports editing of videos capturing states of sports being played.

In response to the above issue, a video editing support device according to one embodiment of the present disclosure includes: a captured video acquirer that acquires a captured video capturing a state of a sport being played, in which the captured video includes an object as a subject; a stock video storage unit that stores a stock video based on the captured video; a condition storage unit that stores multiple attention mark assignment conditions for the object; an attention scene detector that detects an attention scene that satisfies an attention mark assignment condition in the stock video; an attention mark assignment unit that relates, to the attention scene detected, an attention mark corresponding to the type of an attention mark assignment condition associated with the detection; and a stock video display controller that displays the stock video on a predetermined display device and that displays, on the stock video, an attention mark related to an attention scene in the stock video, together with playback time information. Another embodiment of the present disclosure relates to a video editing support method. This method includes: acquiring a captured video capturing a state of a sport being played, in which the captured video includes an object as a subject; storing a stock video based on the captured video; storing multiple attention mark assignment conditions for the object; detecting an attention scene that satisfies an attention mark assignment condition in the stock video; relating, to the attention scene detected, an attention mark corresponding to the type of an attention mark assignment condition associated with the detection; and displaying the stock video on a predetermined display device. In the displaying, an attention mark related to an attention scene in the stock video is displayed together with playback time information, on the stock video.

Optional combinations of the aforementioned constituting elements, and implementation of the present disclosure in the form of methods, apparatuses, systems, computer programs, data structures, and recording media may also be practiced as additional modes of the present disclosure.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIGS. 17A and 17B each show an example of the condition selection screen; and

DETAILED DESCRIPTION

Figure 1:
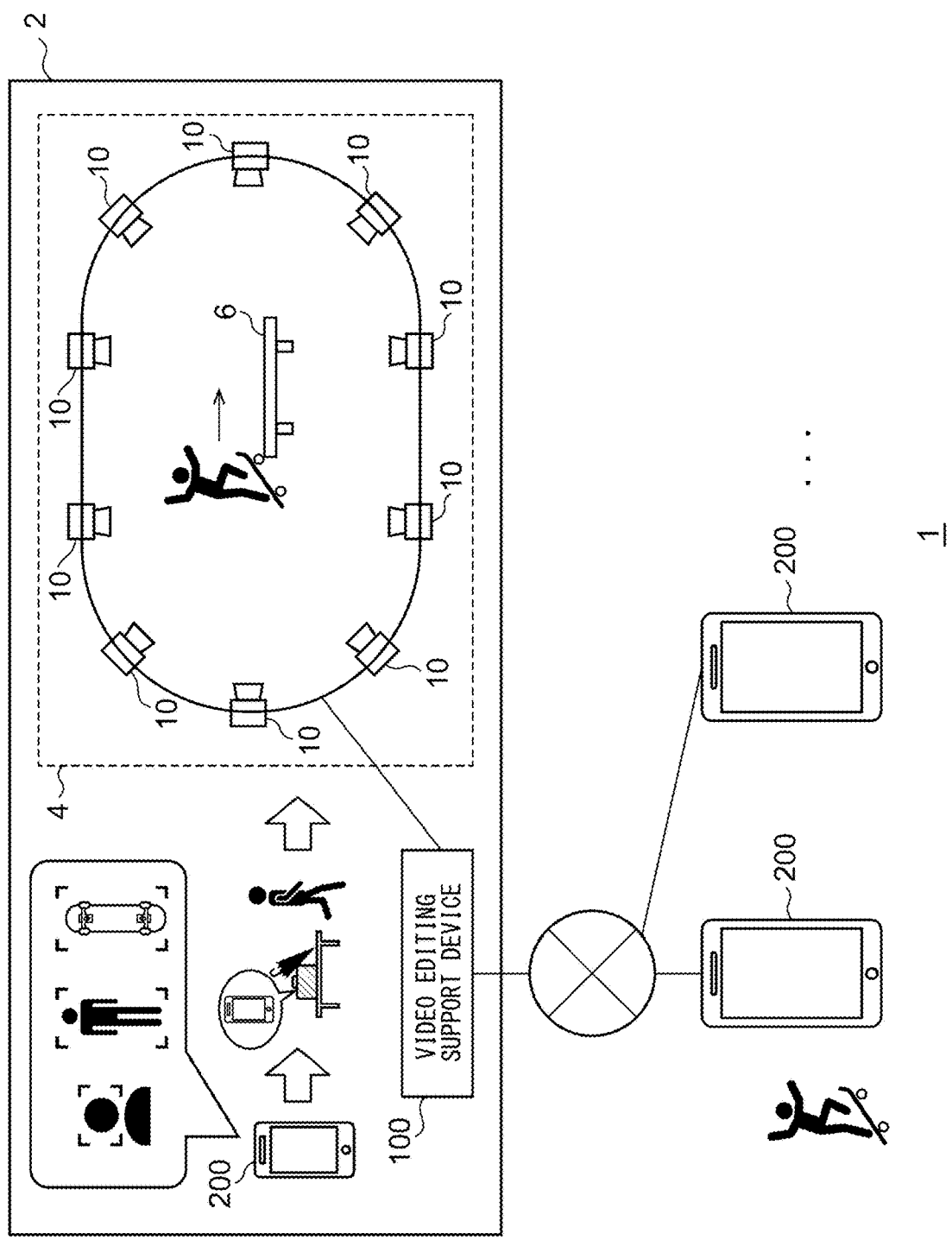
FIG. 1 is a schematic diagram that illustrates an overall configuration of a video editing support system according to an embodiment.

The invention will now be described by reference to the preferred embodiments. This does not intend to limit the scope of the present invention, but to exemplify the invention.

In the following, the present disclosure will be described based on a preferred embodiment with reference to each drawing. In the embodiment and modifications, like reference characters denote like or corresponding constituting elements, and the repetitive description will be omitted as appropriate.

FIG. 1 is a schematic diagram that illustrates an overall configuration of a video editing support system 1 according to an embodiment. In the present embodiment, a video editing support system will be described that supports editing of a captured video featuring skateboarding as an example of sports. The video editing support system 1 includes multiple cameras 10, a video editing support device 100, and multiple user terminals 200. The video editing support device 100 is installed in a skateboard park 2 in FIG. 1. However, the application is not limited thereto, and the video editing support device 100 may be installed in a data center, for example.

When a skateboarder (hereinafter, referred to as a skater) arrives at the skateboard park 2, he or she takes a picture of at least one of his or her face, the body including the cloths, or a board (especially the backside of the deck) using a user terminal 200 or the like and transmits the picture, together with a user ID, to the video editing support device 100. Such a picture may be taken in advance outside the skateboard park 2. The picture is used to identify a video capturing the skater. The skater places his or her belongings other than the board outside a play area 4 and plays in the play area 4.

Each camera 10 is a video camera used to shoot a video of skateboarding performances. Each camera 10 is provided in the play area 4 of the skateboard park 2. The play area 4 is equipped with so-called obstacles 6, such as banks, handrails, and stairs. Although only one obstacle 6 is shown in the play area 4 in FIG. 1, in reality, many obstacles 6 are provided in the play area 4. Also, the number or arrangement of the cameras 10 is not particularly limited, and the cameras 10 may be arranged to encircle the play area 4 or may be arranged to encircle each obstacle 6, for example.

The timing at which a camera 10 starts or finishes video recording is not particularly limited, but it is preferable to start and finish the video recording such that a skateboarding performance is captured without omission. For example, the camera 10 may record a video only when a skater is present in the play area 4. More specifically, the camera 10 may record a video while at least one skater is present in the play area 4 and may stop the video recording while no skater is present in the play area 4. Whether or not a skater is present in the play area 4 may be detected using an appropriate sensor. Also, the camera 10 may record a video at all times while the skateboard park 2 is open, for example.

Each camera 10 transmits the video thus captured to the video editing support device 100.

Each user terminal 200 is an information processing terminal operated by a user to receive a service of the video editing support system 1 and operates as a client for the video editing support device 100. Each user terminal 200 may be a mobile terminal, such as a smartphone or a tablet terminal, or may be a device such as a personal computer.

When a user terminal 200 is equipped with a camera, the user terminal 200 may record a video of a skateboarding performance with the camera and transmit the video to the video editing support device 100. The user terminal 200 may transmit a video of a skateboarding performance recorded with a dedicated camera to the video editing support device 100.

The video editing support device 100 is an information processing device that supports viewing and editing of videos capturing skateboarding performances. The video editing support device 100 stores a video of a skateboarding performance captured by a camera 10 in the skateboard park 2 or the camera of a user terminal 200 (hereinafter, such a video will be referred to as a "captured video"). A captured video may include a skateboard skater, a board used by the skater, and an obstacle 6 on which the skater is sliding or performing a trick.

The video editing support device 100 performs image analysis or the like on a stock video based on a captured video to detect an attention scene, which is a scene that an editor or a viewer should pay attention to in the stock video. A stock video in the present embodiment is a video obtained by converting an object as a subject in a captured video into a three-dimensional object, i.e., a video obtained as a free-viewpoint video. The video editing support device displays a stock video together with attention scene information, with which an attention scene in the stock video is to be recognized, on a display unit of a user terminal 200. A user as an editor may edit the stock video, mainly an attention scene therein, to create an edited video. Also, a user as a viewer may view the stock video, mainly an attention scene therein. That is, by using the video editing support device 100, the editor can easily edit an attention scene, and the viewer can easily view an attention scene.

Figure 2:
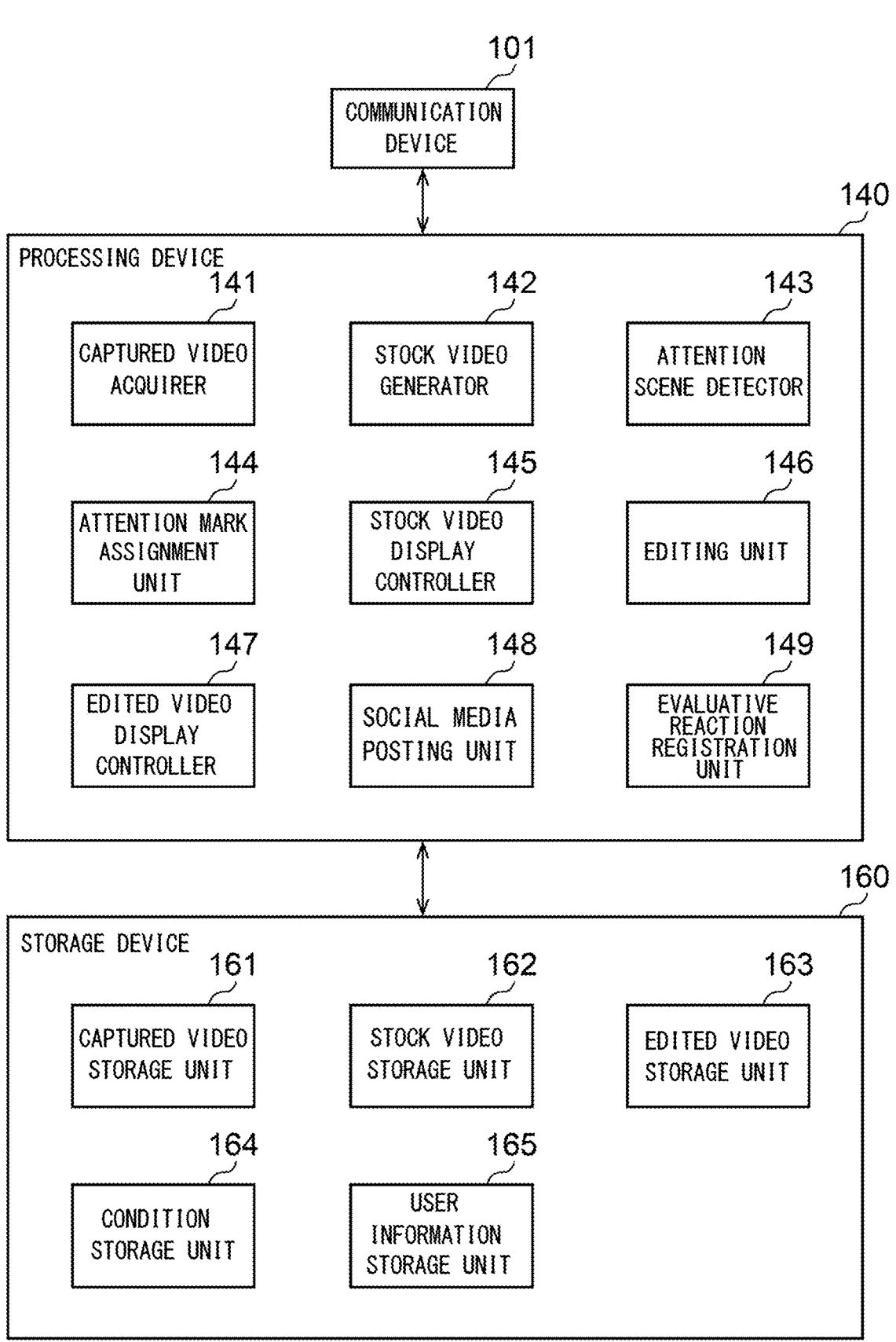
FIG. 2 is a block diagram that shows functions and a configuration of a video editing support device shown in FIG. 1.

FIG. 2 is a block diagram that shows functions and a configuration of the video editing support device 100 shown in FIG. 1. Each block shown therein can be implemented by an element such as a central processing unit (CPU) of a computer or by a mechanism in terms of hardware, and by a computer program or the like in terms of software. FIG. 2 illustrates functional blocks implemented by coordination of those components. Therefore, it will be understood by those skilled in the art who have found the present specification that these functional blocks may be implemented in a variety of forms by combinations of hardware and software. The same applies to each block in FIG. 4.

The video editing support device 100 includes a communication device 101, a processing device 140, and a storage device 160.

The processing device 140 performs various data processes. The storage device 160 stores data that the processing device 140 refers to or updates. The storage device 160 may be semiconductor memory, a hard disk, or the like. The communication device 101 communicates with external devices according to various communication protocols. The processing device 140 transmits or receives data to or from an external device, such as a user terminal 200, via the communication device 101.

The storage device 160 includes a captured video storage unit 161, a stock video storage unit 162, an edited video storage unit 163, a condition storage unit 164, and a user information storage unit 165.

The captured video storage unit 161 stores a captured video ID and a captured video related to each other. The captured video ID is an ID that uniquely identifies a captured video. The captured video is a video capturing a skateboarding performance, as described above.

The stock video storage unit 162 stores a stock video ID, a stock video, and attention scene information related to one another. The stock video ID is an ID that uniquely identifies a stock video. The stock video is a video based on a captured video and is a free-viewpoint video in the present embodiment, as described above. The attention scene information will be detailed later.

The edited video storage unit 163 stores an edited video ID and an edited video related to each other. The edited video ID is an ID that uniquely identifies an edited video. The edited video is a video obtained by editing a stock video, as described above.

The user information storage unit 165 stores a user ID and a picture of a user (skater) related to each other.

The condition storage unit 164 stores multiple attention mark assignment conditions. Each of the multiple attention mark assignment conditions is a condition for detecting an attention scene, which is a scene to be assigned an attention mark, or a scene to be paid attention to. A scene that satisfies one of the multiple attention mark assignment conditions is detected as an attention scene.

The following are examples of the attention mark assignment conditions. However, the attention mark assignment conditions are not limited thereto.

Attention mark assignment conditions associated with skater

A scene in which the skater is jumping a predetermined height or greater from the ground or board A scene in which a knee angle of the skater is a predetermined angle or larger, or a predetermined angle or smaller.

A scene in which the skater's knees are most bent or most straightened

A scene in which an elbow angle of the skater is a predetermined angle or larger, or a predetermined angle or smaller A scene in which the skater is performing a trick using an obstacle and in which the front of the skater's jacket is most visible when viewed from a predetermined viewpoint position in a predetermined viewing direction Attention mark assignment conditions associated with board A scene in which an angle of the board is within a predetermined angle range.

A scene in which the board is located farthest from the ground

A scene in which the board is located away from the ground by a predetermined distance or greater.

A scene in which the board is rotating vertically, around an axis parallel to a short direction of the board, a predetermined number of times or more.

A scene in which the board is rotating laterally, around an axis parallel to a longitudinal direction of the board, at least once A scene in which the skater is performing a trick using an obstacle and in which the back side, or the pattern, of the board is most visible when viewed from a viewpoint position determined in advance for each obstacle, in a predetermined viewing direction Attention mark assignment condition associated with obstacles A scene in which a predetermined obstacle is used Attention mark assignment condition associated with tricks A scene in which a predetermined trick, such as a trick in which the board is separated from the skater or a trick using a predetermined obstacle, is performed Attention mark assignment condition associated with evaluative reactions.

A scene to which a predetermined number or more of viewers have shown certain evaluative reactions, such as positive evaluative reactions Attention mark assignment condition associated with composite evaluation A scene in which the values of multiple evaluation items for the skater or the board satisfy a predetermined relationship The "scene in which the values of multiple evaluation items for the skater or the board satisfy a predetermined relationship" may be, for example, a scene in which an evaluation value based on the values of multiple evaluation items for the skater or the board is greater than or equal to a predetermined threshold or is maximum, or a scene in which such an evaluation value is less than or equal to a predetermined threshold or is minimum.

Figure 3:
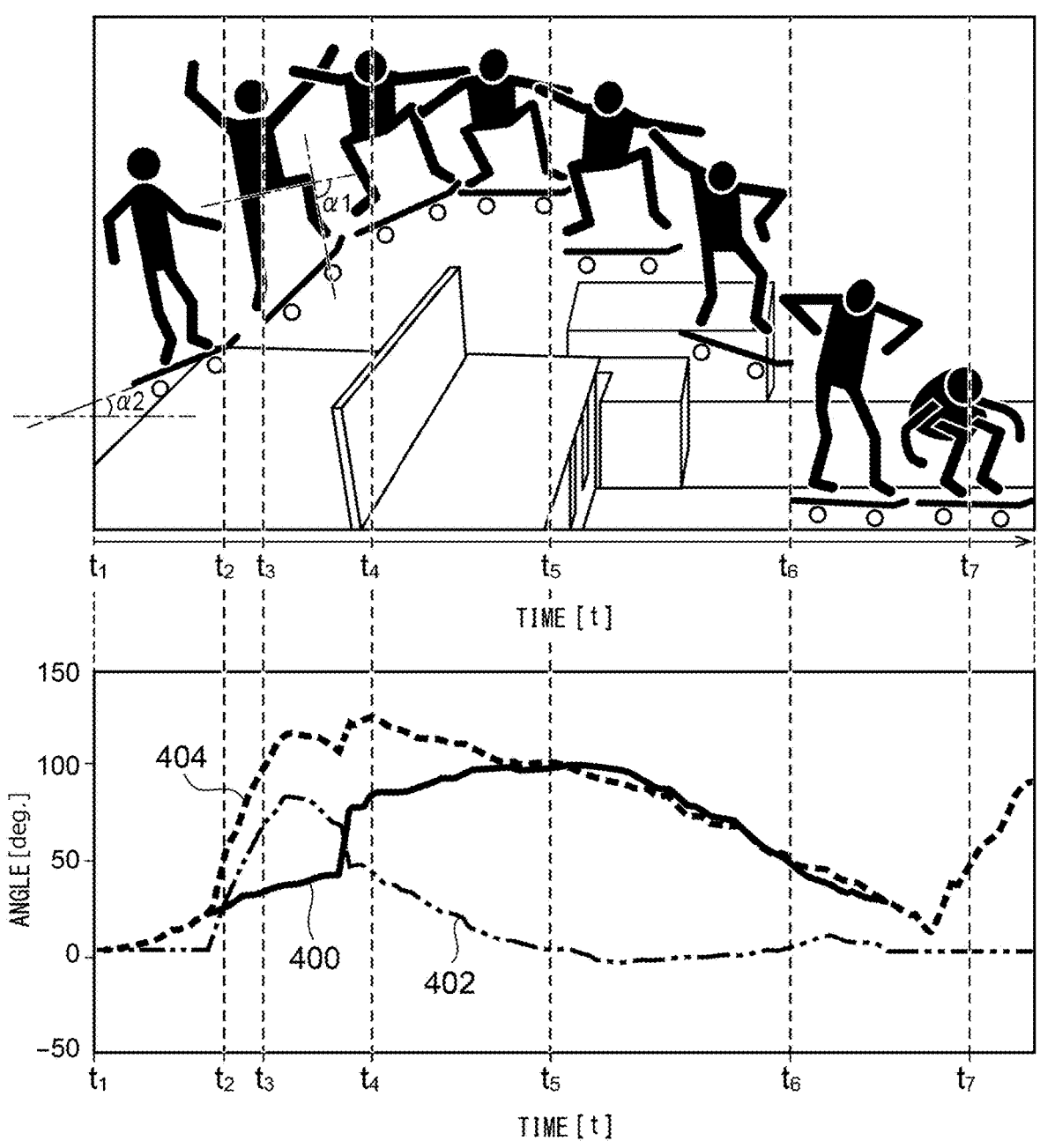
FIG. 3 shows an example of attention mark assignment conditions associated with composite evaluation.

FIG. 3 shows an example of the attention mark assignment conditions associated with composite evaluation. Here, the sum of a skater's knee angle $\alpha 1$ as the value of a first evaluation item and a board's takeoff angle $\alpha 2$ as the value of a second evaluation item, i.e., $\alpha 1+\alpha 2$, is set as an evaluation value. In the present embodiment, the knee angle $\alpha 1$ is an angle formed between a thigh and a lower leg, as shown in FIG. 3. Also, the board's takeoff angle $\alpha 2$ is an angle formed between a horizontal plane and the board, as shown in FIG. 3. The upper illustration in FIG. 3 shows a skater performing a trick. In the lower graph in FIG. 3, the horizontal axis represents time, and the vertical axis represents an angle. A graph 400 is time-series data of the skater's knee angle $\alpha 1$, a graph 402 is time-series data of the board's takeoff angle $\alpha 2$, and a graph 404 is time-series data of the evaluation value ($\alpha 1+\alpha 2$).

In this case, when "a scene in which the evaluation value is maximum" is set as an attention mark assignment condition, for example, a time period including time $t_4$ or before and after the time $t_4$ is detected as an attention scene. Also, when "a scene in which the evaluation value is minimum" is set as an attention mark assignment condition, for example, a time period including time $t_1$ or before and after the time $t_1$ is detected as an attention scene. Also, when "a scene in which the evaluation value is greater than or equal to a predetermined threshold" is set as an attention mark assignment condition, such as when "a scene in which the evaluation value is 100 degrees or greater" is set, the time period from time $t_3$ to time $t_5$ is detected as an attention scene. Also, when "a scene in which the evaluation value is less than or equal to a predetermined threshold" is set as an attention mark assignment condition, such as when "a scene in which the evaluation value is 50 degrees or less" is set, the time period from time $t_1$ to time $t_2$ and the time period from time to $t_6$ time $t_7$ are detected as attention scenes.

The processing device 140 includes a captured video acquirer 141, a stock video generator 142, an attention scene detector 143, an attention mark assignment unit 144, a stock video display controller 145, an editing unit 146, an edited video display controller 147, an social media posting unit 148, and an evaluative reaction registration unit 149.

The captured video acquirer 141 acquires a captured video from a camera 10 or a user terminal 200. The captured video acquirer 141 stores the acquired captured video together with the captured video ID, which is newly numbered, in the captured video storage unit 161.

The stock video generator 142 generates a stock video based on one or more captured videos. As described above, the stock video in the present embodiment is a video obtained by converting an object as a subject in a captured video into a three-dimensional object, i.e., a video obtained as a free-viewpoint video. Therefore, the stock video generator 142 of the present embodiment can be regarded as a three-dimensionalization processing unit that converts an object as a subject into a three-dimensional object. The stock video generator 142 may generate a free-viewpoint video by means of a publicly-known or future available technology.

The stock video generator 142 may generate a stock video based on a captured video selected on a user terminal 200. In this case, the stock video generator 142 may transmit a list of captured videos to the user terminal 200 and receive, from the user terminal 200, the selection of a captured video to be used to generate a stock video.

The selection of a captured video irrelevant to the user of the user terminal 200 may be allowed or may not be allowed. The captured video irrelevant to the user is, for example, a captured video in which the user is not shown as a skater but another skater is shown. Whether or not the user is shown in a given captured video may be judged based on a picture stored in the user information storage unit 165.

Alternatively, the stock video generator 142 may generate a stock video for every captured video, irrespective of the selection from the user terminal 200, i.e., automatically. The stock video generator 142 stores the generated stock video together with the stock video ID, which is newly numbered, in the stock video storage unit 162.

When the skateboard park 2 is equipped with multiple cameras 10, multiple captured videos captured by the multiple cameras 10 during the same time period may be dealt with as a group of captured videos. In this case, the stock video generator 142 may generate a stock video based on multiple captured videos included in the group of captured videos.

The attention scene detector 143 detects an attention scene in a stock video. The attention scene detector 143 may detect an attention scene in every stock video. In this case, when the stock video generator 142 generates a stock video, the attention scene detector 143 detects an attention scene at appropriate timing, e.g., as soon as the stock video is generated. Also, the attention scene detector 143 may detect an attention scene only in a stock video specified by a user terminal 200. In this case, the attention scene detector 143 may detect an attention scene as soon as a stock video is specified by the user terminal 200.

The attention scene detector 143 detects, as an attention scene, a time or a time period when an attention mark assignment condition is satisfied in a stock video. The attention scene detector 143 can perform a first detection process and a second detection process as attention scene detection processing.

The first detection process is a process for detecting, as attention scenes, all scenes that each satisfy one of the attention mark assignment conditions stored in the condition storage unit 164.

The second detection process is a process for detecting, as an attention scene, only a scene that satisfies a specific attention mark assignment condition among multiple attention mark assignment conditions stored in the condition storage unit 164. In other words, only a specific attention mark assignment condition is used to detect an attention scene. Since the second detection process requires less amount of calculation for the detection processing than the first detection process, the processing time for detection by the attention scene detector 143 can be shortened. There may be multiple specific attention mark assignment conditions. In this case, the attention scene detector 143 may detect, as attention scenes, scenes that each satisfy one of the multiple specific attention mark assignment conditions. The attention scene detector 143 may accept the selection of a specific attention mark assignment condition from the user terminal 200. In this case, the attention scene detector 143 may accept the selection of an attention mark assignment condition for an attention scene in a stock video at arbitrary timing before the detection of an attention scene in the stock video is started.

The attention scene detector 143 may be capable of performing only the first detection process or may be capable of performing only the second detection process.

Alternatively, the attention scene detector 143 may be capable of performing both the first detection process and the second detection process. In this case, the user may be able to specify which of the first detection process and the second detection process is performed to detect an attention scene. Alternatively, which of the first detection process and the second detection process is performed to detect an attention scene may be automatically determined in the attention scene detector 143, based on a predetermined judgement factor.

The judgement factor may be, for example, the capacity of a stock video. In this case, the attention scene detector 143 determines adopting the first detection process when the capacity of the stock video is less than a predetermined capacity and determines adopting the second detection process when the capacity of the stock video is greater than or equal to the predetermined capacity.

The judgement factor may be, for example, the length of a stock video, or the time of a stock video. In this case, the attention scene detector 143 determines adopting the first detection process when the length of the stock video is less than a predetermined length and determines adopting the second detection process when the length of the stock video is greater than or equal to the predetermined length.

The judgement factor may be, for example, the processing capability of the video editing support device 100. In this case, the attention scene detector 143 determines adopting the first detection process when the processing capability of the video editing support device 100 is a predetermined value or greater and determines adopting the second detection process when the processing capability of the video editing support device 100 is less than the predetermined value. The processing capability of the video editing support device 100 is, for example, the processing capability of the CPU or the processing capability of the GPU.

The judgement factor may be, for example, an estimated processing time. In this case, the attention scene detector 143 determines adopting the first detection process when an estimated required time of the first detection process is shorter than a predetermined time and determines adopting the second detection process when the estimated required time is longer than or equal to the predetermined time. The method for estimating the required time of the first detection process is not particularly limited.

The judgement factor may be an instruction from external, such as a user terminal 200. In this case, a selection screen for attention scene assignment conditions may be displayed on the user terminal 200, and adopting the first detection process may be determined when all the attention scene assignment conditions are selected, and adopting the second detection process may be determined when only a specific attention scene assignment condition is selected.

The attention scene detector 143 may determine which of the first detection process and the second detection process is performed to detect an attention scene, based on multiple judgement factors. In this case, when adopting the second detection process is endorsed based on at least one judgement factor among the multiple judgement factors, the attention scene detector 143 may determine adopting the second detection process. For example, the attention scene detector 143 may determine adopting the second detection process when at least one of the following conditions is met: the capacity of the stock video is greater than or equal to a predetermined capacity; the length of the stock video is greater than or equal to a predetermined length; the processing capability of the video editing support device 100 is less than a predetermined value; an estimated required time of the first detection process is longer than or equal to a predetermined time; and the second detection process is selected on a user terminal 200.

Using a publicly-known or future available technology of image analysis or posture analysis, the attention scene detector 143 detects a scene that satisfies an attention mark assignment condition associated with the skater, board, tricks, or obstacles.

Among the attention mark assignment conditions for which detection processing is to be performed, when there is an attention mark assignment condition associated with the skater for which image analysis is required, the attention scene detector 143 performs image analysis on all scenes in the stock video to detect the skater and detects, as an attention scene, a time when the attention mark assignment condition is satisfied. For example, when the attention mark assignment condition is "a scene in which the front of the skater's jacket is most visible", the attention scene detector 143 calculates the area of the front of the skater's jacket that is visible on the image at each time and detects, as an attention scene, a time at which the area is largest, or a time period including before and after the time.

Among the attention mark assignment conditions for which detection processing is to be performed, when there is an attention mark assignment condition associated with the skater for which posture analysis is required, the attention scene detector 143 calculates the skater's posture using a skeletal extraction technology for all scenes in the stock video and detects, as an attention scene, a time when the attention mark assignment condition is satisfied. For example, when the attention mark assignment condition is "a scene in which a knee angle of the skater is a predetermined angle or larger", the attention scene detector 143 identifies the knee angle at each time and detects, as an attention scene, a time period for which the knee angle is larger than or equal to the predetermined angle.

Similarly for the board, when there is an attention mark assignment condition associated with the board for which image analysis is required, among the attention mark assignment conditions for which detection processing is to be performed, the attention scene detector 143 performs image analysis on all scenes in the stock video to detect the board and identifies a time when the attention mark assignment condition is satisfied. Also, among the attention mark assignment conditions for which detection processing is to be performed, when there is an attention mark assignment condition associated with the board for which posture analysis is required, the attention scene detector 143 calculates the board's posture using a skeletal extraction technology for all scenes in the stock video and identifies a time when the attention mark assignment condition is satisfied.

When there is an attention mark assignment condition associated with obstacles among the attention mark assignment conditions for which detection processing is to be performed, the attention scene detector 143 performs image analysis on all scenes in the stock video to detect an obstacle associated with the attention mark assignment condition and identifies a time when the attention mark assignment condition is satisfied, i.e., a time when the obstacle appears.

Based on evaluative reaction information stored in the stock video storage unit 162, the attention scene detector 143 detects an attention scene that satisfies an attention mark assignment condition associated with evaluative reactions. More specifically, a scene for which a predetermined number or more of viewers have shown evaluative reactions is detected as an attention scene. The attention scene detector 143 may treat an evaluative reaction shown by a viewer viewing a stock video and shown within a predetermined time from the end of a scene in which a trick is performed, as an evaluative reaction to the scene of the trick. This is because the timing of showing an evaluative reaction is different for each viewer and because an evaluative reaction is usually shown after the trick is finished.

Figure 6:
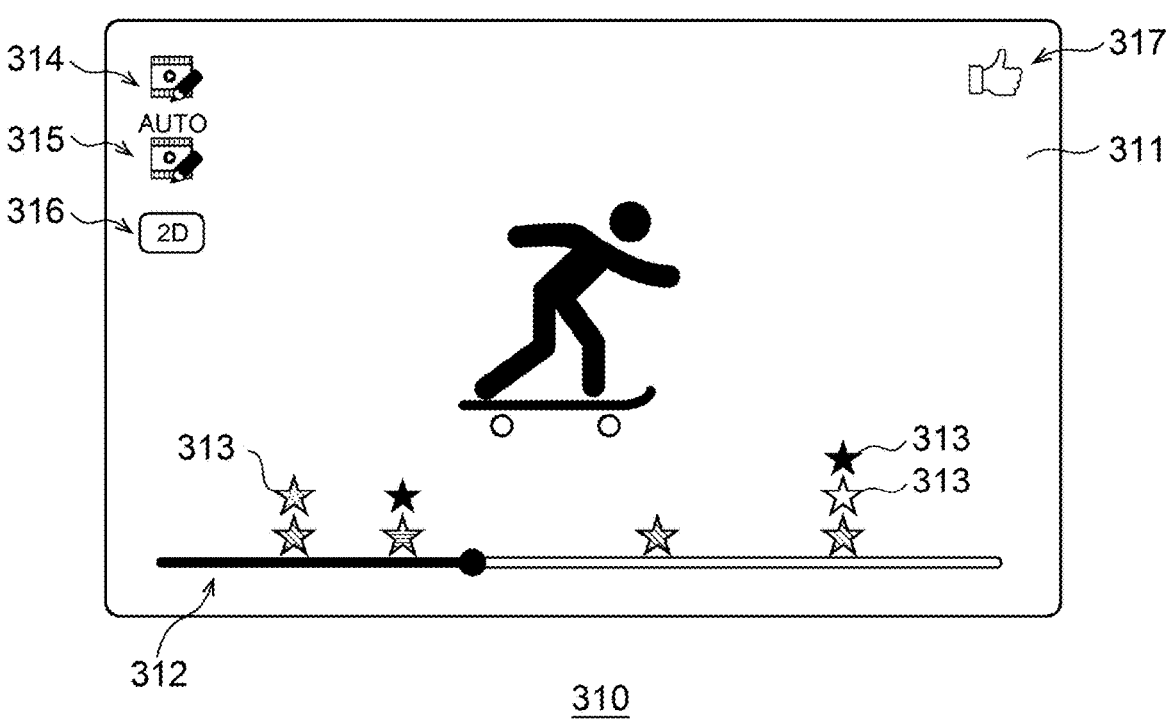
FIG. 6 shows an example of a playback screen for a stock video.

When the attention scene detector 143 has detected one or more attention scenes from a stock video, the attention mark assignment unit 144 relates, to the stock video, an attention mark corresponding to the type of an attention scene, i.e., the type of the attention mark assignment condition associated with the attention scene. The attention mark, which will be described later in detail with reference to FIG. 6, is a mark superimposed and displayed on an edited video and is a mark for making the type of the attention scene, i.e., what kind of scene the attention scene is, recognizable at a glance.

More specifically, the attention mark assignment unit 144 stores, in the stock video storage unit 162, the attention scene information of the one or more attention scenes such as to be related to the stock video. The attention scene information is information in which a time or a time period of an attention scene in a stock video is related to an attention mark corresponding to the type of the attention mark assignment condition associated with the attention scene.

There are six types of attention mark assignment conditions as listed below in the present embodiment. However, the types of the attention mark assignment conditions are not limited thereto.

Attention mark assignment conditions associated with the skater

Attention mark assignment conditions associated with the board

Attention mark assignment conditions associated with obstacles

Attention mark assignment conditions associated with tricks

Attention mark assignment conditions associated with evaluative reactions

Other attention mark assignment conditions, such as attention mark assignment conditions associated with composite evaluation The stock video display controller 145 superimposes, on a stock video, the attention scene information thereof and displays it on a user terminal 200. More specifically, upon receiving a display request from a user terminal 200, the stock video display controller 145 transmits, to the user terminal 200, a stock video associated with the display request, together with the attention scene information of the stock video.

The display of a stock video irrelevant to the user of the user terminal 200 may be allowed or may not be allowed.

When the attention scene detector 143 has performed the first detection process, i.e., the process for detecting, as attention scenes, all scenes that each satisfy one of the attention mark assignment conditions stored in the condition storage unit 164, the stock video display controller 145 superimposes and displays, on the stock video, attention scene information associated with an attention mark assignment condition selected on the user terminal 200, among the attention scenes detected in the first detection process. When the first detection process is performed, since the attention scene information associated with all the attention mark assignment conditions is stored in the stock video storage unit 162, even if the selection of an attention mark assignment condition is changed thereafter, performing the attention scene detection processing again can be avoided.

When the attention scene detector 143 has performed the second detection process, i.e., the process for detecting, as an attention scene, only a scene that satisfies a specific attention mark assignment condition among multiple attention mark assignment conditions stored in the condition storage unit 164, the stock video display controller 145 superimposes and displays, on the stock video, all the attention scene information detected in the second detection process.

The evaluative reaction registration unit 149 acquires evaluative reaction information transmitted from a user terminal 200. The evaluative reaction information is information regarding an evaluative reaction shown by a viewer viewing a stock video, such as a positive evaluative reaction obtained by a Good button or the like being pressed, and the information includes the stock video ID and playback time for which the evaluative reaction has been shown in the stock video. The evaluative reaction registration unit 149 stores, in the stock video storage unit 162, the playback time for which the evaluative reaction has been shown, such as to be related to the stock video.

The editing unit 146 accepts an edit instruction for a stock video from a user terminal 200 and edits the stock video according to the edit instruction. The editing unit 146 stores, in the edited video storage unit 163, an edited video made by editing a stock video. The editing of a stock video irrelevant to the user of the user terminal 200 may be allowed or may not be allowed.

In the present embodiment, there are three types of edit instructions: a basic edit instruction, a semi-automatic edit instruction, and a two-dimensional video making instruction.

Figure 7:
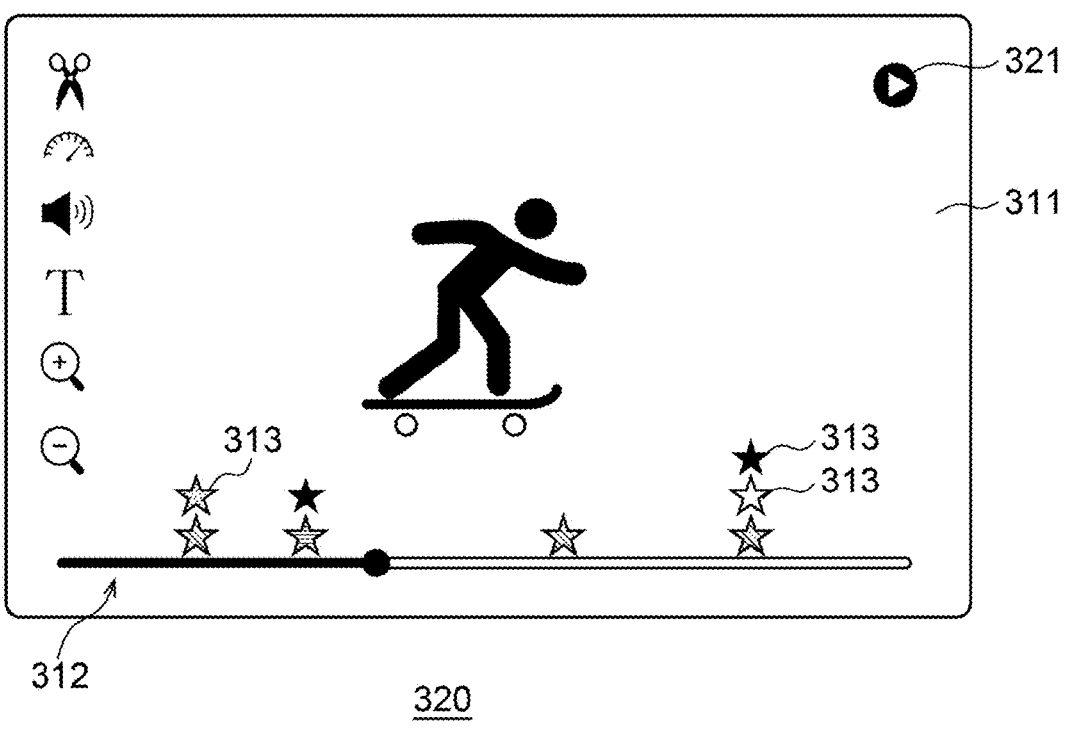
FIG. 7 shows an example of a basic edit screen.

A basic edit instruction is an edit instruction input on a basic edit screen 320 shown in FIG. 7. The basic edit instructions are various basic instructions for editing, such as trimming, changing the playback speed, adjusting the volume, inserting a text, zooming in, and zooming out.

Figure 8:
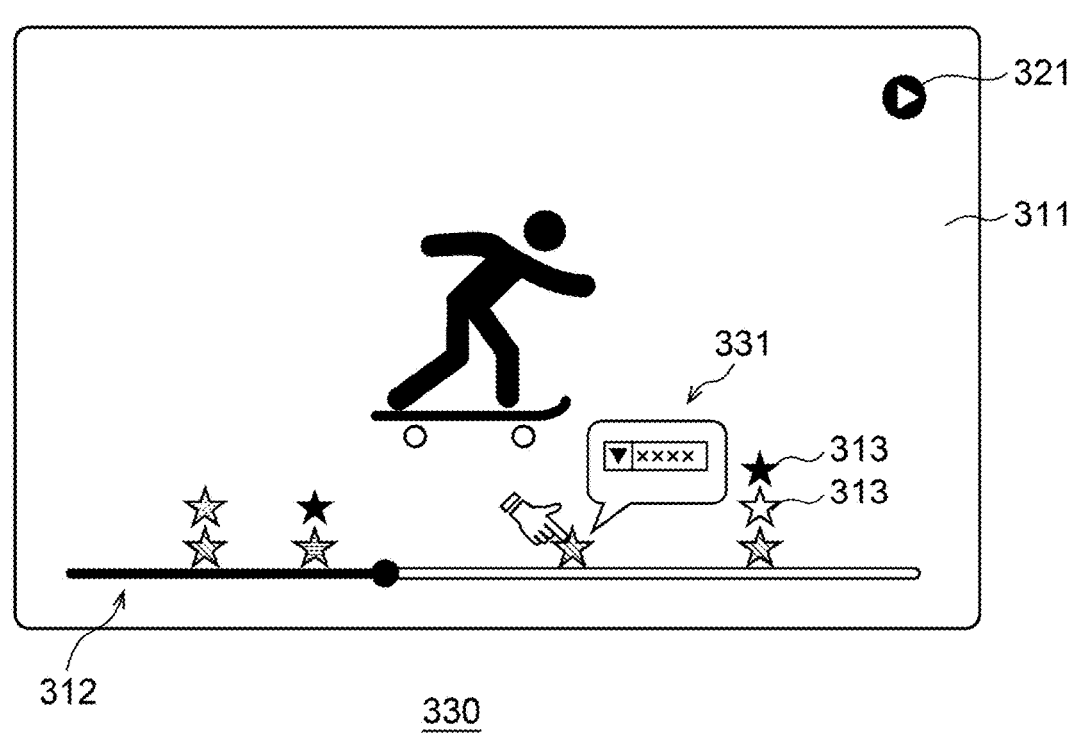
FIG. 8 shows an example of a semi-automatic edit screen.

A semi-automatic edit instruction is an edit instruction input on a semi-automatic edit screen 330 shown in FIG. 8. The semi-automatic edit instruction includes an edit instruction selectively input for an attention scene. The edit instruction selectively input includes instructions for changing the playback speed, zooming in, zooming out, and rotating the viewpoint. The rotating the viewpoint means, for example, shifting the viewpoint such that it makes one rotation around the skater. Upon receiving a semi-automatic edit instruction, the editing unit 146 edits each attention scene according to an edit instruction selectively input and edits the other scenes as predetermined, e.g., such that the viewpoint shifts alongside the skater.

Figure 9:
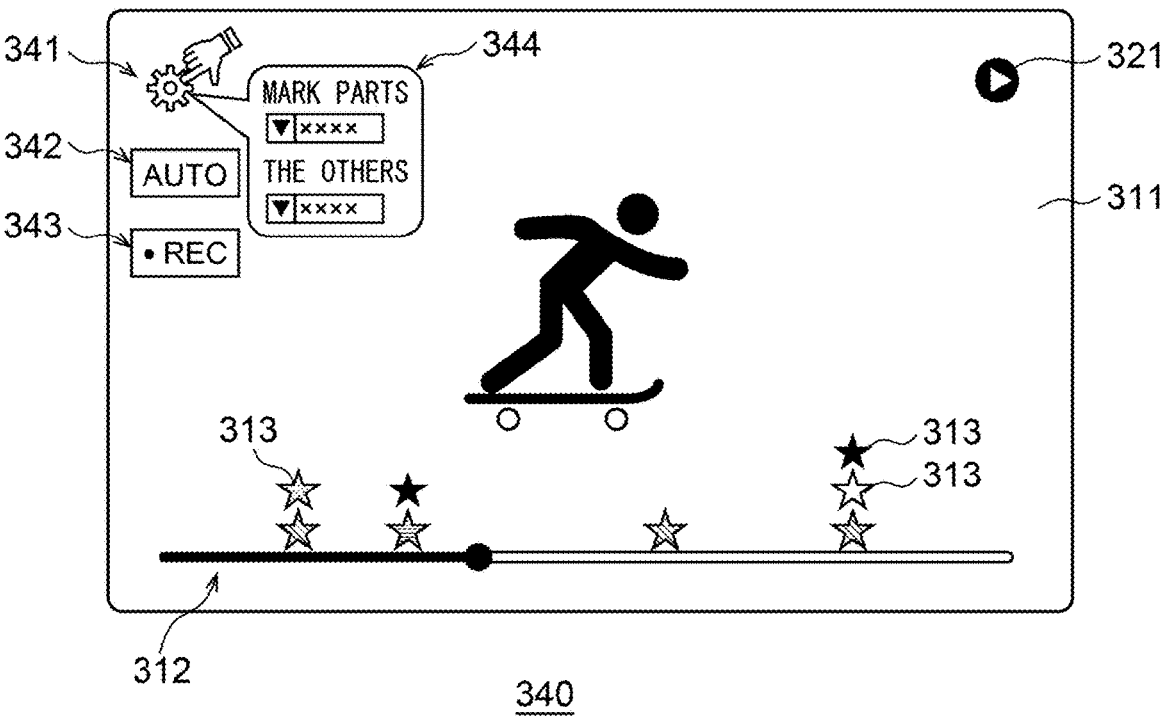
FIG. 9 shows an example of a two-dimensional video making screen.

A two-dimensional video making instruction is an edit instruction input on a two-dimensional video making screen 340 shown in FIG. 9. Upon receiving a two-dimensional video making instruction, the editing unit 146 converts a stock video into a two-dimensional video. This enables uploading of an edited video to social media that do not support free-viewpoint videos. In other words, a two-dimensional video is made to be uploaded to social media that do not support free-viewpoint videos.

In the present embodiment, although not particularly limited, three two-dimensional video making methods of a first two-dimensional video making method, a second two-dimensional video making method, and a third two-dimensional video making method can be selected.

First Two-Dimensional Video Making Method

In this case, the two-dimensional video making instruction includes information indicating that the first two-dimensional video making method has been selected, and an edit instruction selectively input for an attention scene. The edit instruction selectively input is an instruction associated with the viewpoint, such as zooming in, zooming out, and rotating the viewpoint. The editing unit 146 creates a two-dimensional video in which, in each attention scene, the viewpoint shifts according to an edit instruction selectively input and, in each of the other scenes, the viewpoint shifts as predetermined, e.g., the viewpoint shifts alongside the skater.

Second Two-Dimensional Video Making Method

In this case, the two-dimensional video making instruction includes information indicating that the second two-dimensional video making method has been selected. The editing unit 146 creates a two-dimensional video in which, in each attention scene and each of the other scenes, the viewpoint shifts as predetermined, or recommended viewpoint shifting is performed. In this case, even an editor who is not good at editing can create an edited video that is expected to be highly rated by many viewers.

Third Two-Dimensional Video Making Method

In this case, the two-dimensional video making instruction includes information indicating that the third two-dimensional video making method has been selected, and the details of a viewpoint shift operation. The details of a viewpoint shift operation may be data indicating the trajectory of the viewpoint or may be a screen recorded when viewpoint shifting is performed. The editing unit 146 creates a two-dimensional video in which the viewpoint shifts according to the received operation details.

The edited video display controller 147 displays an edited video on a user terminal 200. More specifically, when editing of a stock video according to an edit instruction is completed, the edited video display controller 147 may transmit, without delay, the edited video to the user terminal 200 from which the edit instruction has been transmitted, for example. Also, upon receiving an edited video display request from a user terminal 200, the edited video display controller 147 transmits, to the user terminal 200, an edited video associated with the display request, for example.

The social media posting unit 148 posts, or uploads, an edited video specified by a user terminal 200 to social media specified by the user terminal 200.

Figure 4:
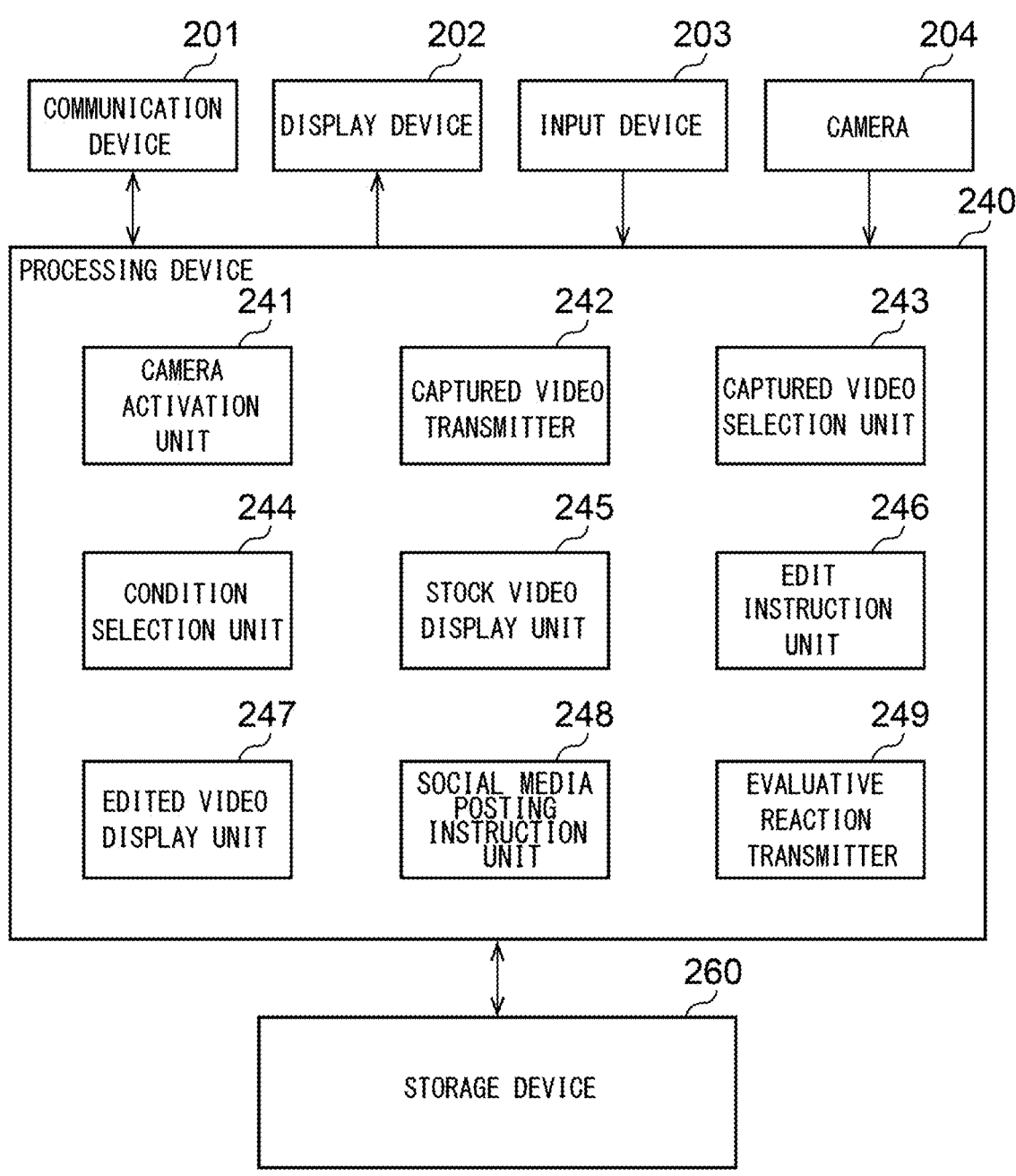
FIG. 4 is a block diagram that shows functions and a configuration of a user terminal shown in FIG. 1.

FIG. 4 is a block diagram that shows functions and a configuration of a user terminal 200 shown in FIG. 1. The user terminal 200 includes a communication device 201, a display device 202, an input device 203, a camera 204, a processing device 240, and a storage device 260.

The processing device 240 performs various data processes. The storage device 260 stores data that the processing device 240 refers to or updates. The storage device 260 may be semiconductor memory, a hard disk, or the like. The communication device 201 communicates with external devices according to various communication protocols. The processing device 240 transmits or receives data to or from an external device, such as the video editing support device 100, via the communication device 201. The display device 202 displays a screen generated by the processing device 240. The display device 202 may be a liquid crystal display, an organic EL display, or the like. The input device 203 transmits, to the processing device 240, an input entry from the user of the user terminal 200. The input device 203 may be physical keys, a touch pad, or the like. The display device 202 and the input device 203 may be implemented as a touch panel. The camera 204 captures an image.

The processing device 240 includes a camera activation unit 241, a captured video transmitter 242, a captured video selection unit 243, a condition selection unit 244, a stock video display unit 245, an edit instruction unit 246, an edited video display unit 247, an social media posting instruction unit 248, and an evaluative reaction transmitter 249. Although not particularly limited, the functions of these multiple functional blocks are implemented as modules of an application program for users of the video editing support system 1 (hereinafter, referred to as the "video editing support App"). The user terminal 200 may download the video editing support App from a site on the Internet that provides a digital content distribution service. Also, for example, the video editing support App may be stored on a recording medium and installed therefrom on the storage device 260. A processor (CPU, GPU, or the like) of the user terminal 200 may read the video editing support App installed on the storage device 260 into the main memory and execute the video editing support App to implement the function of each block in the processing device 240.

The camera activation unit 241 activates the camera 204 in response to the user's operation. The captured video transmitter 242 transmits, to the video editing support device 100, a captured video of a skateboarding performance captured by the camera 204.

The captured video selection unit 243 allows the user to select a captured video used to generate a stock video. Accordingly, the captured video selection unit 243 acquires a list of captured videos from the video editing support device 100 and displays a list screen, not illustrated, for the captured videos on the display device 202. On the list screen, thumbnails of the captured videos and information regarding the captured videos, such as the start date and time of shooting, are displayed, for example. The user selects a captured video on the list screen. The captured video selection unit 243 notifies the video editing support device 100 of the captured video ID of the selected captured video. When the stock videos of all captured videos are generated automatically, the captured video selection unit 243 is not necessary.

The condition selection unit 244 allows the user to select an attention mark assignment condition. Accordingly, the condition selection unit 244 displays a condition selection screen 300, which will be described later with reference to FIG. 5, on the display device 202. The user selects an attention mark assignment condition on the condition selection screen 300. The condition selection unit 244 notifies the video editing support device 100 of the attention mark assignment condition thus selected.

The stock video display unit 245 displays a stock video and the attention scene information thereof on the display device 202. Accordingly, the stock video display unit 245 acquires a list of stock videos from the video editing support device 100 and displays a list screen, not illustrated, for the stock videos on the display device 202. The stock video display unit 245 may acquire from the video editing support device 100 a list that contains only stock videos for which the attention scene detection processing has been completed. On the list screen, thumbnails of the stock videos and information regarding the stock videos, such as the start date and time of shooting, are displayed, for example. The user selects a stock video on the list screen. The stock video display unit 245 transmits, to the video editing support device 100, a stock video display request including the stock video ID of the selected stock video. The stock video display unit 245 acquires, from the video editing support device 100, a stock video transmitted in response to the display request and displays the stock video on the display device 202. The stock video display unit 245 particularly superimposes and displays, on the stock video, the attention scene information transmitted with the stock video.

The evaluative reaction transmitter 249 receives an evaluative reaction shown by the user viewing a stock video and transmits, to the video editing support device 100, the evaluative reaction information that includes the stock video ID and the playback time for which the evaluative reaction has been received. The evaluative reaction is shown by, for example, tapping an evaluative reaction icon 317 shown in FIG. 6, which will be described later.

The edit instruction unit 246 instructs the video editing support device 100 to edit a stock video. Accordingly, the edit instruction unit 246 displays an edit screen, which will be described later with reference to FIGS. 7-9, on the display device 202. An edit screen can be regarded as a screen on which a stock video is displayed in an edit mode. The user inputs an edit instruction for a stock video on an edit screen. The edit instruction unit 246 transmits to the video editing support device 100 the edit instruction thus input.

The edited video display unit 247 displays an edited video on the display device 202. For example, during editing of a stock video, the edited video display unit 247 may acquire, from the video editing support device 100, an edited video associated with an edit instruction transmitted from the edit instruction unit 246. Also, for example, the edited video display unit 247 may acquire a list of edited videos from the video editing support device 100, display a list screen, not illustrated, for the edited videos on the display device 202, accept the selection of an edited video from the user via the input device 203, transmit a display request for the edited video thus selected to the video editing support device 100, and acquire the edited video transmitted in response to the display request. The edited video display unit 247 displays the acquired edited video on the display device 202.

The social media posting instruction unit 248 instructs the video editing support device 100 to post an edited video on social media. For example, the user may input, on a playback screen 350 for an edited video, a posting instruction for posting the edited video on social media. The social media posting instruction unit 248 transmits to the video editing support device 100 the posting instruction thus input.

Figure 5:
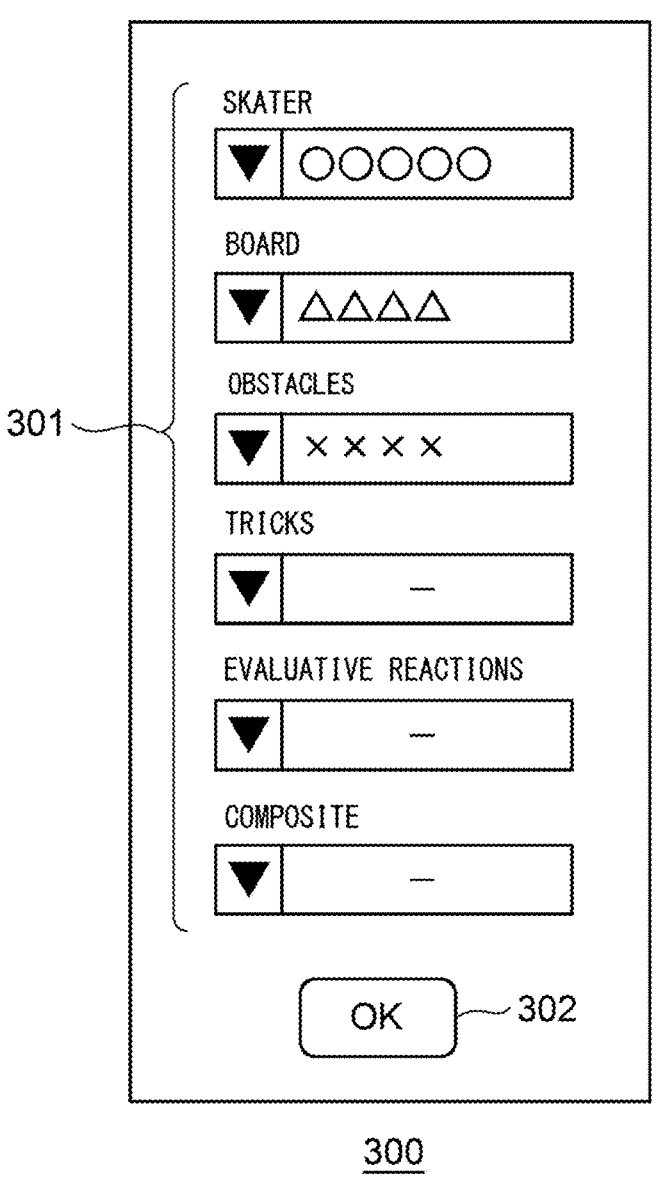
FIG. 5 shows an example of a condition selection screen.

FIG. 5 shows an example of the condition selection screen 300. The condition selection screen 300 includes: a condition selection region 301 configured such that the user can select and input an attention mark assignment condition in a pull-down format for each of the skater, board, tricks, obstacles, evaluative reactions, and composite; and an OK button 302. When an attention mark assignment condition is selected and input in the condition selection region 301 and the OK button 302 is selected, the condition selection unit 244 accepts the attention mark assignment condition selected and input in the condition selection region 301 and transmits the selection of the attention mark assignment condition thus accepted to the video editing support device 100.

FIG. 6 shows an example of a playback screen 310 for a stock video. On the playback screen 310, a stock video 311 is displayed. Since the stock video 311 is a free-viewpoint video in the present embodiment, the viewpoint can be freely selected. Also, on the playback screen 310, a seek bar (playback time information) 312 and attention marks 313 for attention scenes are displayed such as to be superimposed on the stock video 311.

Each attention mark 313 is displayed at a position with which the playback timing of an attention scene, such as the start time of the playback of the attention scene, can be recognized based on the seek bar 312. The position with which the playback timing of an attention scene can be recognized may be, for example, directly above a position in the seek bar 312 corresponding to the start time of the attention scene or may be directly above a position in the seek bar 312 corresponding to a time that is a predetermined margin time (3 seconds, for example) before the start time of the attention scene.

Each attention mark 313 is displayed in a different manner (in color, shape, or a combination thereof, for example) for each type of attention scene. That is, for attention scenes associated respectively with the skater, board, tricks, obstacles, evaluative reactions, and composite, marks are displayed in manners different from each other. In FIG. 6, the attention marks are star-shaped marks, and a star-shaped mark in a different color is displayed for each type of attention scene.

Each attention mark 313 may be configured in a shape with which the type of the attention scene can be recognized. For example, the attention mark of an attention scene associated with the skater may be a mark in the shape of a person, the attention mark of an attention scene associated with the board may be a mark in the shape of a board, and the attention mark of an attention scene associated with tricks may be a mark in the shape of a person performing a trick.

The evaluative reaction icon 317 is tapped when an evaluative reaction is given for the scene being viewed. When the evaluative reaction icon 317 is tapped, the evaluative reaction transmitter 249 transmits the evaluative reaction information to the video editing support device 100.

Also, on the playback screen 310 in the example of FIG. 6, edit icons used to shift the screen to an edit screen are displayed. More specifically, on the playback screen 310, three edit icons of a basic edit icon 314, a semi-automatic edit icon 315, and a two-dimensional video making icon 316 are displayed.

FIG. 7 shows an example of the basic edit screen 320. The basic edit screen 320 is displayed when the basic edit icon 314 is selected on the playback screen 310 shown in FIG. 6. On the basic edit screen, various basic edit instructions, such as instructions for trimming, changing the playback speed, adjusting the volume, inserting a text, zooming in, and zooming out, are input. When a reflection icon 321 is selected, the edit instruction unit 246 accepts an edit instruction and transmits the edit instruction thus accepted to the video editing support device 100.

FIG. 8 shows an example of the semi-automatic edit screen 330. The semi-automatic edit screen 330 is displayed when the semi-automatic edit icon 315 is selected on the playback screen 310 shown in FIG. 6. When an attention mark 313 of an attention scene is selected on the semi-automatic edit screen 330, a presentation effect selection region 331 is displayed, which is configured such that a presentation effect for the attention scene can be input in a selective format, such as a pull-down format. When a presentation effect is selected in the presentation effect selection region 331 and the reflection icon 321 is selected, the edit instruction unit 246 accepts the presentation effect selected and input in the presentation effect selection region 331 and transmits the selection of the presentation effect thus accepted to the video editing support device 100.

FIG. 9 shows an example of the two-dimensional video making screen 340. The two-dimensional video making screen 340 is displayed when the two-dimensional video making icon 316 is selected on the playback screen 310 shown in FIG. 6. The two-dimensional video making screen 340 includes a first two-dimensional video making icon 341, a second two-dimensional video making icon 342, and a third two-dimensional video making icon 343.

When the first two-dimensional video making icon 341 is selected, a viewpoint shifting selection region 344 is displayed, which is configured such that each of the viewpoint shifting in the attention scenes and the viewpoint shifting in the other scenes can be input in a selective format, such as a pull-down format. When each of the viewpoint shifting in the attention scenes and the viewpoint shifting in the other scenes is selected in the viewpoint shifting selection region 344 and the reflection icon 321 is selected, the edit instruction unit 246 accepts that the first two-dimensional video making method has been selected and also accepts the viewpoint shifting selected and input in the viewpoint shifting selection region 344. The edit instruction unit 246 transmits, to the video editing support device 100, information indicating that the first two-dimensional video making method has been selected, and the selection of the viewpoint shifting thus accepted.

When the second two-dimensional video making icon 342 is selected and the reflection icon 321 is selected, the edit instruction unit 246 accepts that the second two-dimensional video making method has been selected and transmits, to the video editing support device 100, information indicating that the second two-dimensional video making method has been selected.

When a viewpoint shift operation is actually performed with the third two-dimensional video making icon 343 being selected and when the reflection icon 321 is selected, the edit instruction unit 246 accepts that the third two-dimensional video making method has been selected and also accepts the details of the viewpoint shift operation. The edit instruction unit 246 transmits, to the video editing support device 100, information indicating that the third two-dimensional video making method has been selected, and the details of the viewpoint shift operation thus accepted. The details of a viewpoint shift operation may be data indicating the trajectory of the viewpoint or may be a screen recorded when viewpoint shifting is performed.

Figure 10:
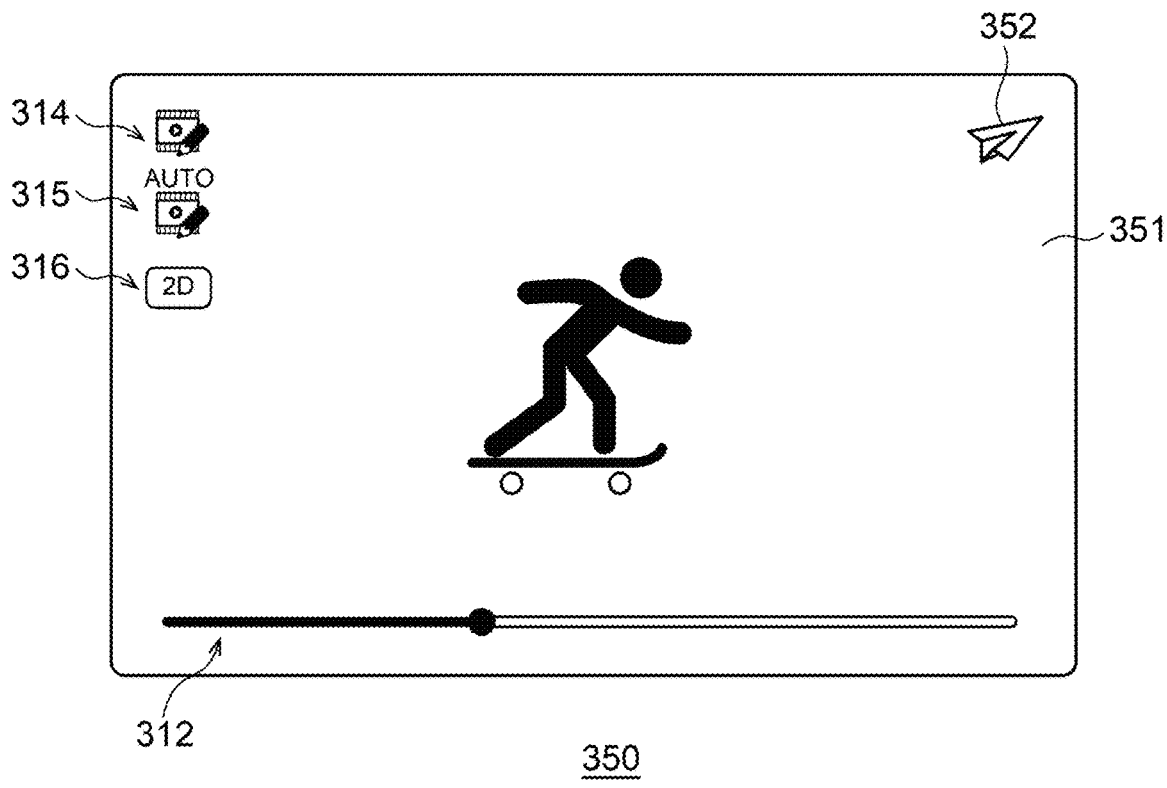
FIG. 10 shows an example of a playback screen for an edited video.

FIG. 10 shows an example of the playback screen 350 for an edited video. On the playback screen 350, an edited video 351 is displayed. When an social media posting icon 352 is selected, the social media posting instruction unit 248 transmits, to the video editing support device 100, a posting instruction for posting, on social media, the edited video thus displayed. On the playback screen 350, the edit icons 314, 315, and 316 are displayed, and, when one of the icons is selected, the screen shifts to an edit screen on which editing is enabled again.

Figure 11:
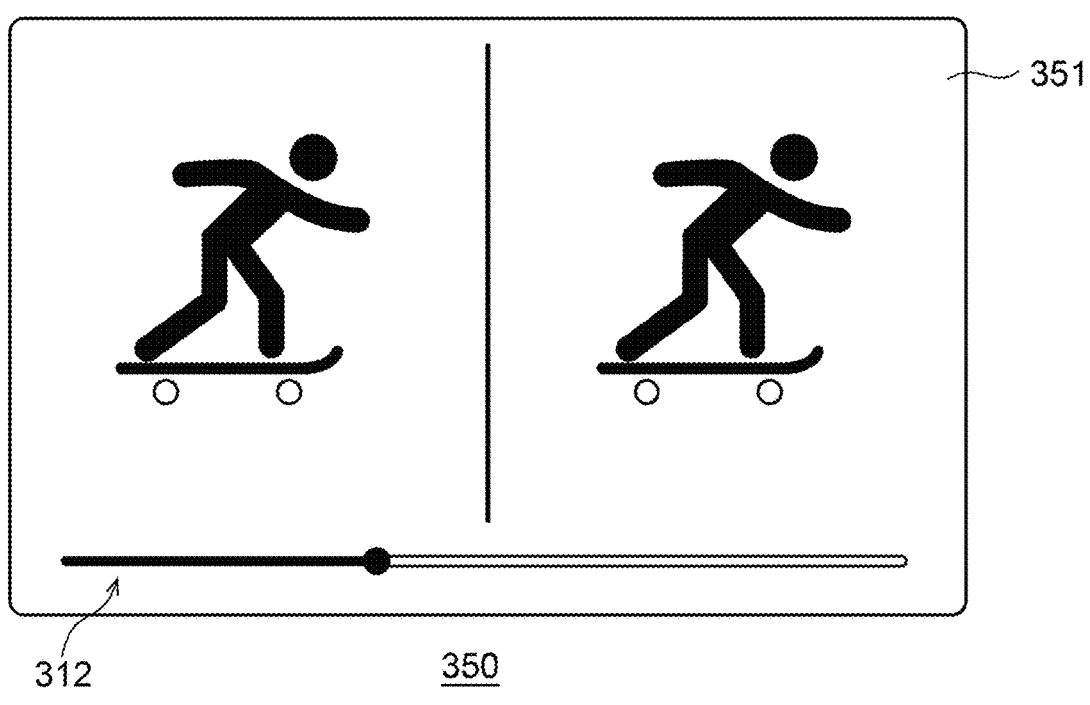
FIG. 11 shows another example of a playback screen for an edited video.

FIG. 11 shows another example of the playback screen 350 for an edited video. In this example, two edited videos are displayed next to each other on the playback screen 350. The two edited videos may be arranged side by side, as shown in the example of FIG. 11, or may be arranged vertically. The two edited videos may both be videos of performances by the user himself or herself, may both be videos of other user's performances, or one may be a video of a performance by the user himself or herself and the other may be a video of another user's performance.

Figure 12:
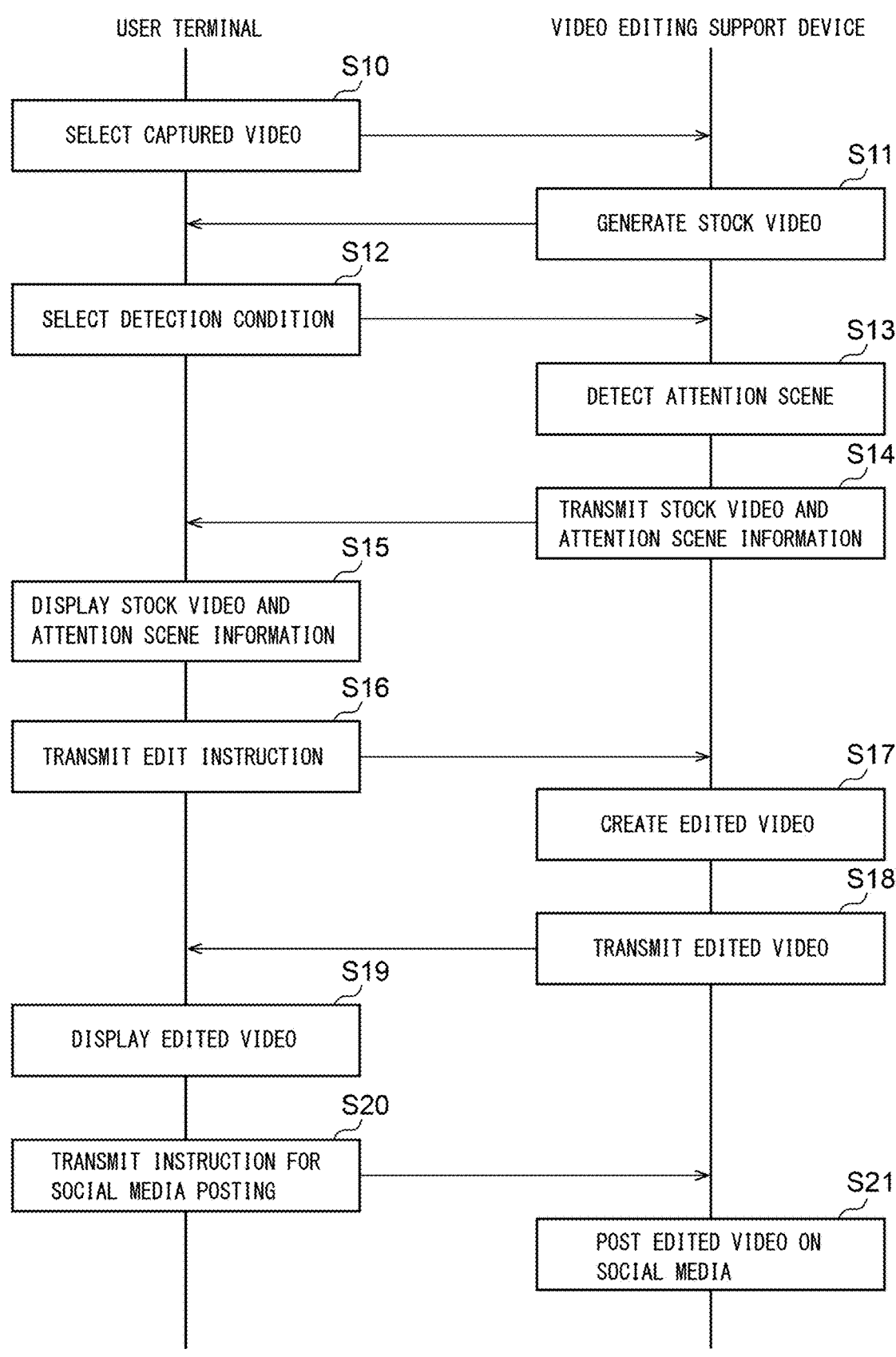
FIG. 12 is a sequential diagram that shows an example of a series of processes performed by the video editing support system.

There will now be described an operation performed by the video editing support system 1 configured as described above. FIG. 12 is a sequential diagram that shows an example of a series of processes performed by the video editing support system 1.

The captured video selection unit 243 of the user terminal 200 accepts the user's selection of a captured video and notifies the video editing support device 100 of identification information of the captured video thus selected (S10). The stock video generator 142 of the video editing support device 100 generates a stock video, or a free-viewpoint video, based on the captured video thus selected (S11). The condition selection unit 244 of the user terminal 200 accepts the user's selection of an attention mark assignment condition and notifies the video editing support device 100 of the attention mark assignment condition thus selected (S12). The selection of the attention mark assignment condition may be performed after the generation of the stock video is completed, may be performed before the generation of the stock video is completed, or may be performed before the generation of the stock video is started. The attention scene detector 143 of the video editing support device 100 detects an attention scene in the stock video based on the attention mark assignment condition thus selected (S13). The stock video display controller 145 of the video editing support device 100 transmits, to the user terminal 200, the stock video generated at S11, and the attention scene information detected at S13 (S14). The stock video display unit 245 of the user terminal 200 acquires the stock video and the attention scene information and displays them on the display device 202 (S15). The edit instruction unit 246 of the user terminal 200 accepts an edit instruction for the stock video from the user and transmits the edit instruction for the stock video to the video editing support device 100 (S16). The editing unit 146 of the video editing support device 100 edits the stock video, or creates an edited video, according to the edit instruction (S17). When the editing unit 146 completes the editing of the stock video, the stock video display controller 145 transmits the edited video, as a result of editing the stock video, to the user terminal 200 without delay, for example (S18). The edited video display unit 247 acquires the edited video and displays it on the display device 202 (S19). The social media posting instruction unit 248 of the user terminal 200 accepts, from the user who has checked the edited video, a posting instruction for posting the edited video on social media and transmits the posting instruction to the video editing support device 100 (S20). The social media posting unit 148 of the video editing support device 100 registers, on social media, the edited video of which the posting has been instructed (S21).

The series of processes in FIG. 12 only show an example, and there may be a case where a video is only edited and not posted on social media (i.e., the video is released only to users of the video editing support system 1) or a case where a stock video is not edited. Also, another step may be added, one or some steps may be changed or deleted, or the order of the steps may be changed.

According to the present embodiment, an attention mark associated with an attention scene is displayed together with the playback time information on a stock video. This allows the user as an editor to easily find out an attention scene in a stock video using an attention mark as a mark and to create an edited video by editing the stock video, mainly the attention scene. That is, the editor can edit a video more easily.

Also, according to the present embodiment, when the first detection process is employed as the detection processing performed by the attention scene detector 143, all scenes that each satisfy one of the attention mark assignment conditions stored in the condition storage unit 164 are detected as attention scenes. In this case, even if the selection of an attention mark assignment condition is changed, performing the attention scene detection processing again can be avoided.

Also, according to the present embodiment, when the second detection process is employed as the detection processing performed by the attention scene detector 143, only a scene that satisfies a specific attention mark assignment condition among multiple attention mark assignment conditions stored in the condition storage unit 164 is used for detection of an attention scene. Therefore, only a scene that satisfies a specific attention mark assignment condition is detected as an attention scene.

Also, according to the present embodiment, when the attention scene detector 143 can perform the first detection process and the second detection process, which of the processes is performed to detect an attention scene can be automatically determined in the attention scene detector 143. This avoids requiring extra work of the user.

Also, according to the present embodiment, the stock videos are free-viewpoint videos, and the edited videos are also free-viewpoint videos unless they have been converted into two-dimensional videos. Therefore, even if the angle from which the editor wishes to show a video differs from the angle from which a viewer desires to view the video, the viewer can view the video from the desired angle, regardless of the angle from which the editor wishes to show the video. As a result, evaluative reactions, such as positive evaluative reactions, from more viewers can be expected. Also, since viewers can view a video from their desired angles, even if the editor does not have advanced editing skills, evaluative reactions, especially positive evaluative reactions, from the viewers can be expected. In addition, although the awesomeness or power of tricks in skateboarding performances may be sometimes difficult to be conveyed to people who are not familiar with skateboarding, such as those who are new to skateboarding or those who have little knowledge about skateboarding, it is expected, as an effect, that, by viewing a video from various angles, such people can understand the awesomeness or power more easily.

The present disclosure has been described based on an embodiment. The embodiment is intended to be illustrative only, and it will be obvious to those skilled in the art that various modifications to a combination of constituting elements or processes could be developed and that such modifications also fall within the scope of the present disclosure.

Modification 1

In the embodiment, the video editing support system 1 is applied to support the editing of videos capturing skateboarding performances. However, the video editing support system 1 can also be applied to support editing of videos capturing sports other than skateboarding being played. In the following, the cases where the video editing support system 1 is applied to sports other than skateboarding will be described, mainly for the differences from the embodiment.

Modification 1-1

A case where the video editing support system 1 is applied to a marathon as an example of sports will be described.

Figure 13:
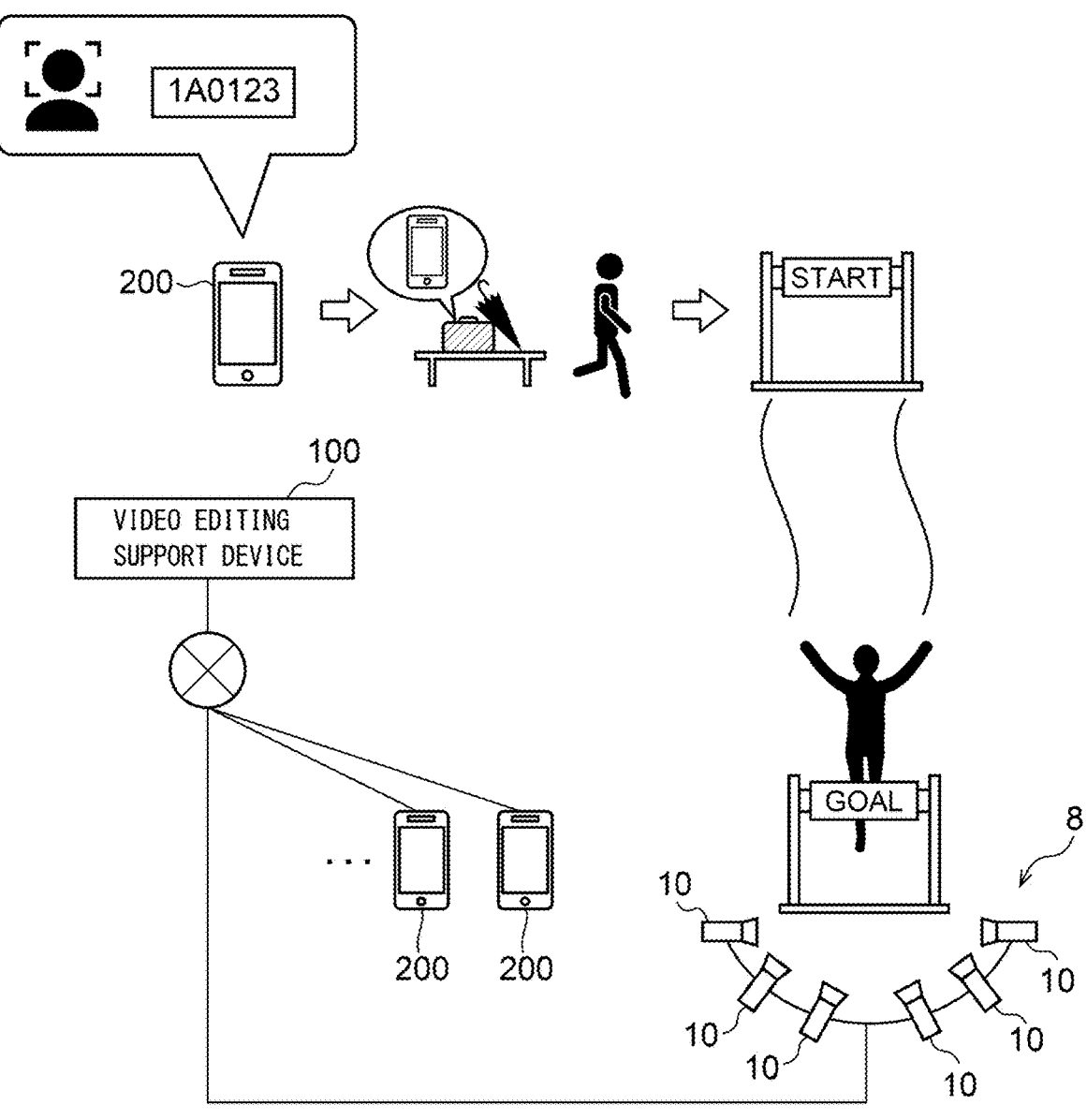
FIG. 13 is a schematic diagram that illustrates an overall configuration of a video editing support system according to a modification.

FIG. 13 is a schematic diagram that illustrates an overall configuration of the video editing support system 1 according to a modification. FIG. 13 corresponds to FIG. 1. Although not particularly limited, the video editing support device 100 is installed in a data center.

When a marathon runner arrives at a marathon race venue, he or she takes a picture of at least one of his or her face and the number cloth, using the user terminal 200 or the like, and transmits the picture, together with the user ID, to the video editing support device 100. The picture is used to identify a video capturing the runner. The runner places his or her belongings at an appropriate location and participates in the marathon.

A number or character string on the number cloth may be stored in advance in the user information storage unit 165 of the video editing support device 100 such as to be related to the user ID. In this case, the picture of the number cloth need not be taken. Further, the picture of the face need not also be taken.

In the present modification, a camera 10 is provided in a shooting area 8 of the marathon race course. The shooting area 8 is a finish line area in this example but may be a start area or any other area. In the present modification, a captured video captured by a camera 10 or the user terminal 200 may include a state of a marathon, i.e., a runner.

The video editing support device 100 is basically configured in the same manner as in the embodiment and is represented by the same block diagram shown in FIG. 2. The condition storage unit 164 stores multiple attention mark assignment conditions for a marathon. The following are examples of the attention mark assignment conditions. However, the attention mark assignment conditions are not limited thereto.

Attention mark assignment conditions associated with runner's facial expressions A scene in which the runner is smiling A scene in which the runner is crying.

A scene in which the runner shows a pained expression.

A scene in which the runner shows a chagrined expression

Attention mark assignment conditions associated with runner's poses

A scene in which the runner is raising his or her first in the air

A scene in which the runner is raising his or her arms in the air.

A scene in which the runner is waving his or her hand

A scene in which the runner is tapping his or her chest

Other attention mark assignment conditions associated with runner

A scene in which one of the runner's feet is in contact with the ground

A scene in which a knee angle of the runner is a predetermined angle or larger, or a predetermined angle or smaller Attention mark assignment condition associated with evaluative reactions.

Figure 14:
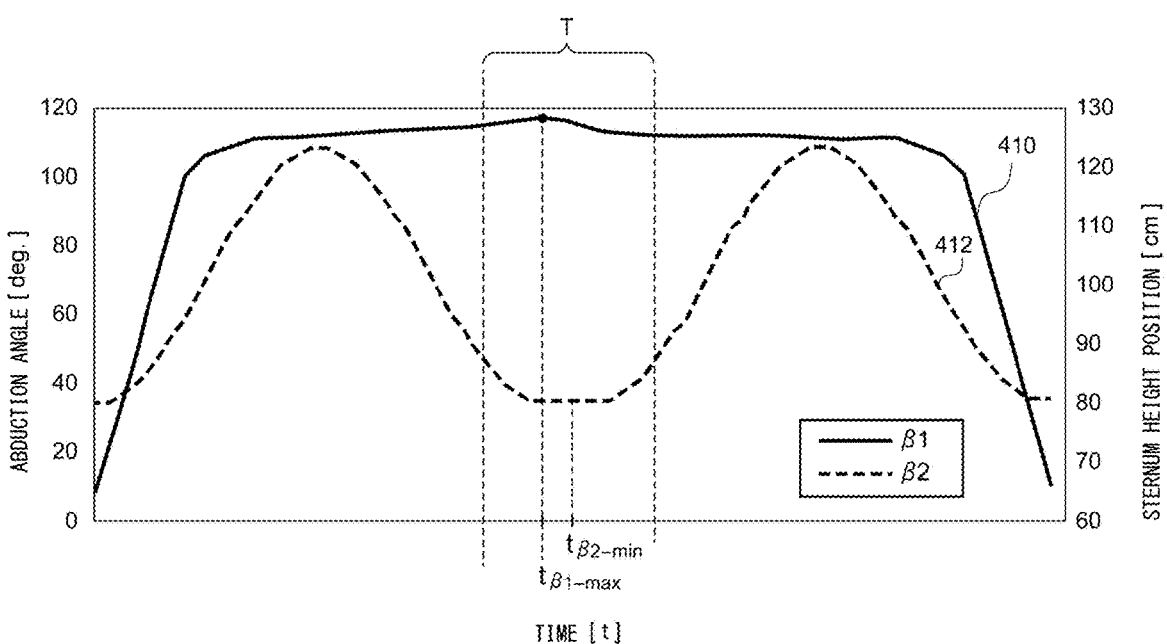
FIG. 14 shows an example of attention mark assignment conditions associated with composite evaluation.
Figure 15:
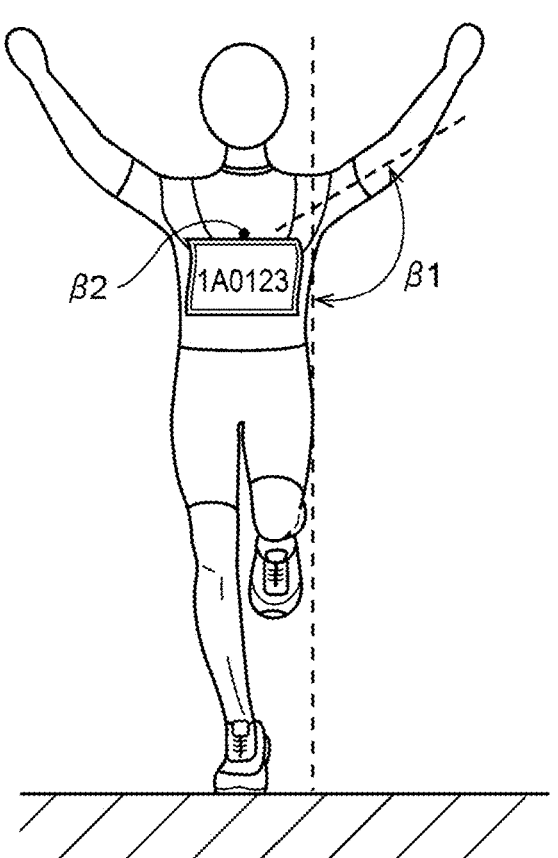
FIG. 15 shows evaluation items.

A scene to which a predetermined number or more of viewers have shown certain evaluative reactions, such as positive evaluative reactions Attention mark assignment condition associated with composite evaluation A scene in which the values of multiple evaluation items for the runner satisfy a predetermined relationship FIG. 14 shows an example of attention mark assignment conditions associated with composite evaluation. FIG. 15 shows evaluation items. FIG. 15 shows a finish scene in a marathon, where a runner is raising his or her arms in the air. Here, a shoulder joint abduction angle $\beta 1$ of the runner as the value of the first evaluation item and a sternum height position $\beta 2$ of the runner as the value of the second evaluation item are used. In the present modification, the shoulder joint abduction angle $\beta 1$ of the runner is an angle formed between an upper arm and a vertical line, as shown in FIG. 15. The abduction angle $\beta 1$ may be an average of the abduction angles of the left and right shoulder joints or may be the abduction angle of either the left or right shoulder joint. Although not particularly limited, the sternum height position 2 of the runner may be the height position of the center of the sternum from the ground or may be the height position of a predetermined portion of the sternum, such as the manubrium, from the ground. The sternum height position 2 is used to detect a time when one of the runner's feet is in contact with the ground. Also, an evaluation item other than the sternum height position $\beta 2$ may be adopted.

In the graph of FIG. 14, the horizontal axis represents time, the left vertical axis represents the shoulder joint abduction angle, and the right vertical axis represents the sternum height position. A graph 410 is time-series data of the shoulder joint abduction angle $\beta 1$ of the runner, and a graph 412 is time-series data of the sternum height position $\beta 2$ of the runner. In particular, the graphs 410 and 412 are time-series data that include a time for which the runner is raising his or her arms in the air and also include before and after the time.

It is assumed here that, as an attention mark assignment condition, a condition for detecting a scene in which the runner finishes the race, one of the runner's feet is in contact with the ground, and the runner is raising his or her arms in the air is set. More specifically, within a time range in which the shoulder joint abduction angle $\beta 1$ is a predetermined angle or larger, i.e., the runner is raising his or her arms in the air, in a predetermined time range T centered on a time $t_{\beta 2\_min}$ at which the sternum height position $\beta 2$ is at the lowest position, a time $t_{\beta 1\_max}$ at which the shoulder joint abduction angle $\beta 1$ becomes maximum is detected as an attention scene. The time range T may be, for example, 0.2 to 0.3 seconds. When there are multiple times at which the shoulder joint abduction angle $\beta 1$ becomes maximum, the time closest to the time $t_{\beta 2\_min}$ among the multiple times is detected as an attention scene. Also, a time period including before and after the time $t_{\beta 1\_max}$ may be detected as an attention scene.

According to the present modification, effects similar to those in the embodiment can be achieved with regard to the editing and viewing of a captured video capturing a state of a marathon.

Modification 1-2

A case where the video editing support system 1 is applied to basketball as an example of sports will be described. In this case, a camera 10 is disposed around a basketball court, for example. The video editing support device 100 is installed in a data center, for example. In the present modification, a captured video captured by a camera 10 or the user terminal 200 may include a state of basketball being played, specifically, a basketball player and a basketball.

The video editing support device 100 is basically configured in the same manner as in the embodiment. The condition storage unit 164 stores multiple attention mark assignment conditions for basketball. The following are examples of the attention mark assignment conditions. However, the attention mark assignment conditions are not limited thereto.

Attention assignment conditions associated with player

A scene in which the player is jumping highest

A scene in which the player is jumping a predetermined distance or greater

A scene in which the player is squatting lowest

A scene in which a knee angle of the player is the largest or smallest

A scene in which a knee angle of the player is a predetermined angle or larger, or a predetermined angle or smaller A scene in which an elbow angle of the player is a predetermined angle or larger, or a predetermined angle or smaller Attention assignment conditions associated with ball A scene in which the ball is located farthest in a height direction from the court surface, i.e., at the highest position A scene in which the ball is located away in a height direction from the court surface by a predetermined distance or greater A scene in which the moving speed of the ball is fastest A scene in which the moving speed of the ball is a predetermined speed or higher A scene in which the rotational speed of the ball is highest.

A scene in which the rotational speed of the ball is a predetermined speed or higher Attention assignment conditions associated with shooting A scene of making a jump shot A scene of shooting a lay-up A scene of shooting a reverse lay-up A scene of making a dunk Attention mark assignment condition associated with evaluative reactions A scene to which a predetermined number or more of viewers have shown certain evaluative reactions, such as positive evaluative reactions Attention mark assignment condition associated with composite evaluation A scene in which the values of multiple evaluation items for the player or the ball satisfy a predetermined relationship According to the present modification, effects similar to those in the embodiment can be achieved with regard to the editing and viewing of a captured video capturing a state of basketball being played.

Modification 1-3

A case where the video editing support system 1 is applied to tennis as an example of sports will be described. In this case, a camera 10 is disposed around a tennis court, for example. The video editing support device 100 is installed in a data center, for example. In the present modification, a captured video captured by a camera 10 or the user terminal 200 may include a state of tennis being played, specifically, a tennis player, a tennis racket, and a tennis ball.

The video editing support device 100 is basically configured in the same manner as in the embodiment. The condition storage unit 164 stores multiple attention mark assignment conditions for tennis. The following are examples of the attention mark assignment conditions. However, the attention mark assignment conditions are not limited thereto.

Attention assignment conditions associated with player

A scene in which the player is squatting lowest

A scene in which the player's knees are most bent or straightened

A scene in which a knee angle of the player is a predetermined angle or larger, or a predetermined angle or smaller A scene in which an elbow angle of the player is a predetermined angle or larger, or a predetermined angle or smaller Attention assignment conditions associated with tennis racket.

A scene in which the swing speed of the tennis racket is fastest.

A scene in which the swing speed of the tennis racket is a predetermined speed or higher.

A scene in which the tennis racket is located farthest in a height direction from the court surface, i.e., at the highest position A scene in which the tennis racket is located away in a height direction from the court surface by a predetermined distance or greater Attention assignment conditions associated with tennis ball A scene in which the tennis ball is located farthest in a height direction from the court surface, i.e., at the highest position A scene in which the tennis ball is located away in a height direction from the court surface by a predetermined distance or greater A scene in which the moving speed of the tennis ball is fastest.

A scene in which the moving speed of the tennis ball is a predetermined speed or higher A scene in which the rotational speed of the tennis ball is highest.

A scene in which the rotational speed of the tennis ball is a predetermined speed or higher According to the present modification, effects similar to those in the embodiment can be achieved with regard to the editing and viewing of a captured video capturing a state of tennis being played.

Modification 2

The video editing support system 1 may be configured to be capable of supporting editing and viewing of captured videos of multiple sports. In the following, description will be given mainly for the differences from the embodiment.

First, a camera 10 will be described. Each camera 10 transmits, to the video editing support device 100, a captured video together with information indicating the type of the captured sport. For example, a camera 10 provided in the play area 4 of the skateboard park 2 transmits, to the video editing support device 100, a captured video together with information indicating skateboarding. For example, a camera 10 provided in the shooting area 8, such as a finish line area of a marathon course, transmits, to the video editing support device 100, a captured video together with information indicating a marathon.

There will now be described the video editing support device 100. The video editing support device 100 is basically configured in the same manner as in the embodiment and is represented by the same block diagram shown in FIG. 2.

The captured video storage unit 161 stores a captured video such that which sport the captured video is for can be identified. For example, the captured video storage unit 161 may store the sport type, the captured video ID, and the captured video related to one another. Alternatively, the captured video storage unit 161 may be prepared for each sport type.

The stock video storage unit 162 stores a stock video such that which sport the stock video is for can be identified. For example, the stock video storage unit 162 may store the sport type, the stock video ID, the stock video, and the attention scene information related to one another. Alternatively, the stock video storage unit 162 may be prepared for each sport type.

The edited video storage unit 163 stores an edited video such that which sport the edited video is for can be identified. For example, the edited video storage unit 163 may store the sport type, the edited video ID, and the edited video related to one another. Alternatively, the edited video storage unit 163 may be prepared for each sport type.

The condition storage unit 164 stores multiple attention mark assignment conditions for each sport type. The condition storage unit 164 stores an attention mark assignment condition such that which sport the attention mark assignment condition is for can be identified. For example, the condition storage unit 164 may store the sport type and the attention mark assignment condition related to each other. Alternatively, the condition storage unit 164 may be prepared for each sport type.

The captured video acquirer 141 judges which sport the acquired captured video is for. The captured video acquirer 141 stores, in the captured video acquirer 141, the captured video such that the sport type thereof can be identified. The captured video acquirer 141 may acquire, from a camera 10, information indicating a sport type together with a captured video and may judge the sport type based on the information. The captured video acquirer 141 may acquire, from the user terminal 200, information indicating a sport type selected by the user, together with a captured video, and may judge the sport type based on the information. The captured video acquirer 141 may judge which sport the acquired captured video is for, by means of a publicly-known or future available technology of image analysis or posture analysis.

The attention scene detector 143 detects an attention scene in a stock video, using an attention mark assignment condition that coincides in sport type with the stock video. For example, for the first detection process, among multiple attention mark assignment conditions stored in the condition storage unit 164, all attention mark assignment conditions that coincide in sport type with the stock video are used. Also, for the second detection process, among multiple attention mark assignment conditions stored in the condition storage unit 164, a specific attention mark assignment condition that coincides in sport type with the stock video is used.

In summary, the video editing support device 100 stores various videos such that the sport types thereof can be identified and detects, when detecting an attention scene in a stock video, an attention scene using an attention mark assignment condition that coincides in sport type with the stock video.

Figure 16:
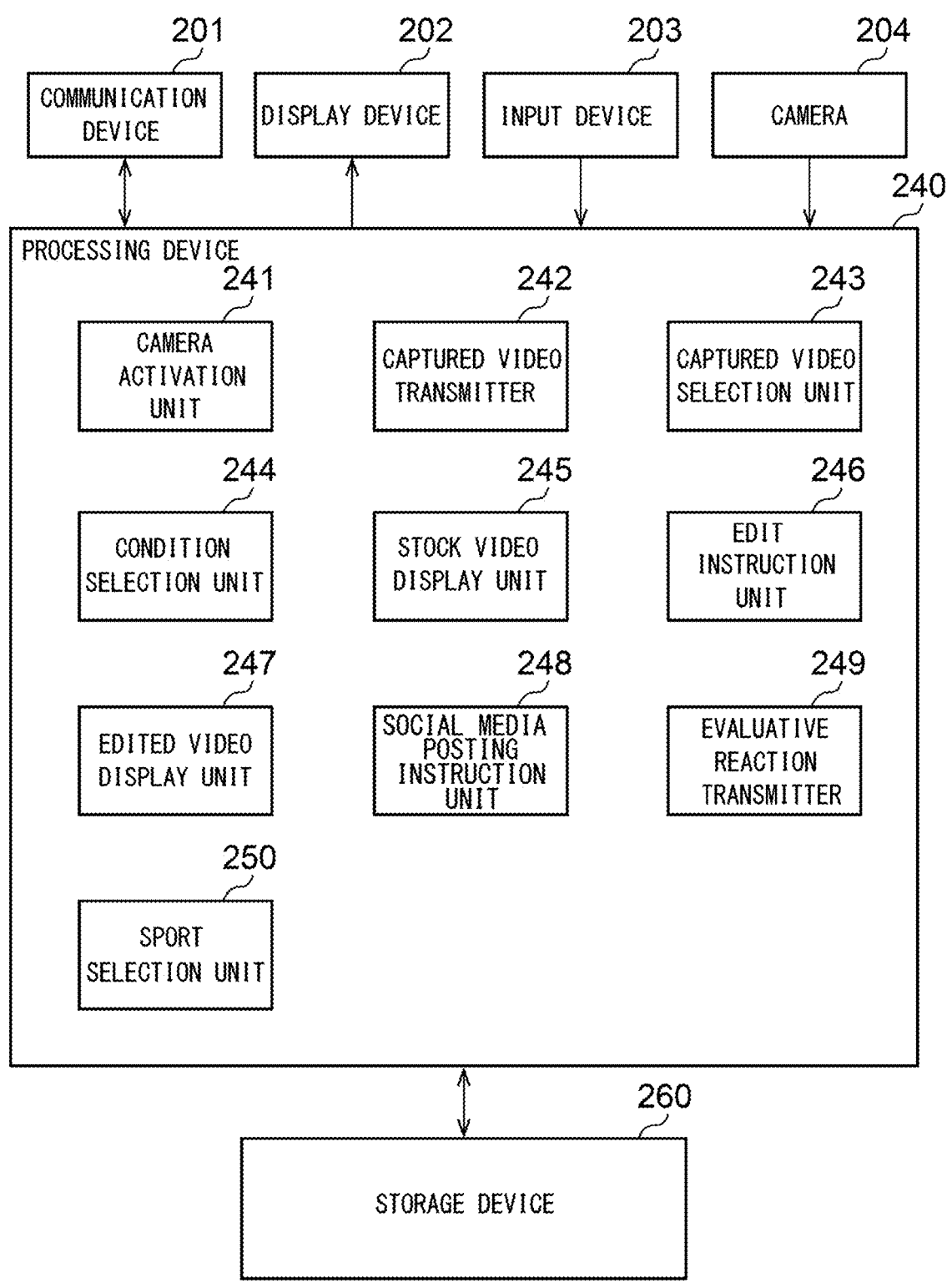
FIG. 16 is a block diagram that shows functions and a configuration of a user terminal in a modification.

There will now be described the user terminal 200. FIG. 16 is a block diagram that shows functions and a configuration of the user terminal 200. The processing device 240 of the user terminal 200 in the present modification further includes a sport selection unit 250.

The sport selection unit 250 allows the user to select a sport type. Accordingly, the sport selection unit 250 displays a list screen, not illustrated, for sport types on the display device 202. On the list screen, sport types, such as "skateboarding", "marathon", "basketball", and "tennis", are displayed. The user selects a sport type on the list screen. The sport selection unit 250 acquires the sport type thus selected.

The sport selection unit 250 allows the user to select a sport type at appropriate timing. The sport selection unit 250 may allow the user to select a sport type immediately after the video editing support App is launched, before or after a state of a sport being played is shot with the camera 204, or when the user edits or views a video.

The captured video transmitter 242 transmits, to the video editing support device 100, a captured video together with a sport type acquired by the sport selection unit 250. When the video editing support device 100 can judge the sport type of the captured video by image analysis or the like, the captured video transmitter 242 need not to transmit the sport type of the captured video.

The condition selection unit 244 displays, on the display device 202, the condition selection screen 300 on which an attention assignment condition for the sport type acquired by the sport selection unit 250 can be selected.

When skateboarding is selected, the condition selection unit 244 may display, on the display device 202, the condition selection screen 300 on which the following attention mark assignment conditions can be selected, as shown in FIG. 5.

Attention mark assignment conditions associated with the skater

Attention mark assignment conditions associated with the board

Attention mark assignment conditions associated with obstacles

Attention mark assignment conditions associated with tricks

Attention mark assignment conditions associated with evaluative reactions

Attention mark assignment conditions associated with composite evaluation

When a marathon is selected, the condition selection unit 244 may display, on the display device 202, the condition selection screen 300 on which the following attention mark assignment conditions can be selected.

Attention mark assignment conditions associated with a runner's facial expressions Attention mark assignment conditions associated with a runner's poses Other attention mark assignment conditions associated with a runner Attention mark assignment conditions associated with evaluative reactions Attention mark assignment conditions associated with composite evaluation When basketball is selected, the condition selection unit 244 may display, on the display device 202, the condition selection screen 300 on which the following attention mark assignment conditions can be selected.

Attention assignment conditions associated with a player

Attention assignment conditions associated with a ball

Attention assignment conditions associated with shooting

Attention mark assignment conditions associated with evaluative reactions

Attention mark assignment conditions associated with composite evaluation

When tennis is selected, the condition selection unit 244 may display, on the display device 202, the condition selection screen 300 on which the following attention mark assignment conditions can be selected.

Attention assignment conditions associated with a player

Attention assignment conditions associated with a tennis racket

Attention assignment conditions associated with a tennis ball

In summary, the user terminal 200 allows the user to select a sport type at appropriate timing. Therefore, the user terminal 200 can transmit, to the video editing support device 100, a captured video together with the sport type thus selected. Also, the user can select an attention assignment condition for the selected sport type.

Modification 3

Although the embodiment and the aforementioned modifications do not particularly refer to, with regard to attention mark assignment conditions including thresholds, the user may specify the thresholds. Using skateboarding as an example, in the attention mark assignment condition of "a scene in which the board is located away from the ground by a predetermined distance or greater", for example, the predetermined distance may be specified by the user. Although not particularly limited, when an attention mark assignment condition including a threshold is selected, the screen may be shifted to a screen on which the threshold can be entered, and the user's entry may be accepted.

FIGS. 17A and 17B each show an example of the condition selection screen 300 displayed on the display device 202 by the condition selection unit 244. On the condition selection screen 300 of FIG. 17A, the attention mark condition of "a scene in which the board is located away from the ground by a predetermined distance or greater" (displayed as "located away from the ground by XX cm or greater" on the screen) is selected as an attention mark assignment condition associated with the board. Accordingly, the condition selection screen 300 shifts to the state shown in FIG. 17B. In FIG. 17B, the condition selection screen 300 includes an entry field 303 into which the threshold in the attention mark assignment condition associated with the board is entered. In FIG. 17B, "50" is entered in the entry field 303. In this case, the condition selection unit 244 notifies the video editing support device 100 that the attention mark assignment condition of "a scene in which the board is located away from the ground by 50 cm or greater" has been selected.

According to the present modification, an attention scene can be detected more to the user's liking.

Modification 4

Although the embodiment and the aforementioned modifications do not particularly refer to, multiple attention mark assignment conditions may be set for the same object. Using skateboarding as an example, two or more attention mark assignment conditions associated with the board may be set, for example.

Figures 18A, 18B:
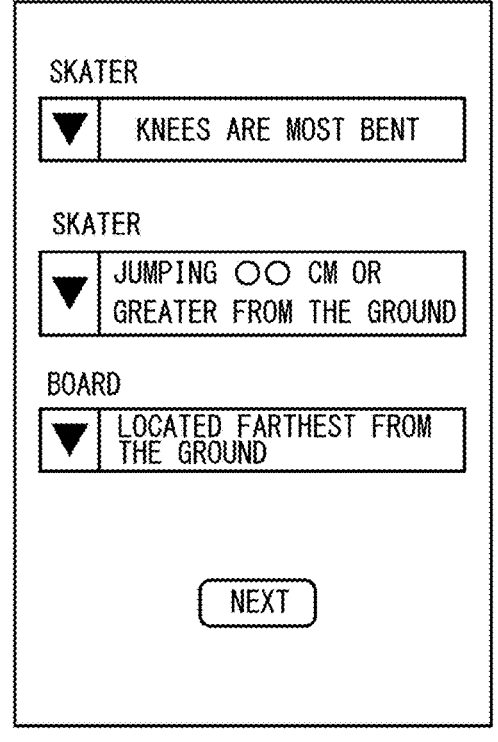
FIGS. 18A and 18B each show an example of the condition selection screen.

FIGS. 18A and 18B each show an example of the condition selection screen 300 displayed on the display device 202 by the condition selection unit 244. FIG. 18A is a screen before shifting, and FIG. 18B is a screen after shifting. When the NEXT button is selected in FIG. 18A, the screen shifts to FIG. 18B. As shown in FIG. 18A, on the condition selection screen 300 of the present modification, an object for which an attention mark assignment condition is set can be selected. In FIG. 18A, SKATER is selected in two fields, and BOARD is selected in one field. In this case, as shown in FIG. 18B after shifting, two attention mark assignment conditions associated with the skater can be selected, and one attention mark assignment condition associated with the board can be selected.

According to the present modification, an attention scene can be detected more to the user's liking.

Modification 5

Although stock videos in the embodiment and the aforementioned modifications are free-viewpoint videos, stock videos may be captured videos themselves or may be videos (non-free viewpoint videos) obtained by cutting, trimming, or connecting one or more captured videos. That is, stock videos may be two-dimensional videos. As a further modification, a configuration is conceivable in which the processing device 140 does not include the stock video generator. In this case, captured videos as they are may be used as stock videos. In such cases, the editing unit 146 edits a stock video as a two-dimensional video to create a two-dimensional edited video.

As a further modification, when a stock video is a two-dimensional video as described above, the editing unit 146 may edit the two-dimensional video to create a two-dimensional edited video and then convert an object as a subject in the two-dimensional edited video into a three-dimensional object, so as to create a free-viewpoint video. The edited video thus generated may be uploaded from the social media posting unit 148 to a social media platform where three-dimensional videos can be uploaded.

Modification 6

Although the embodiment and the aforementioned modifications do not particularly refer to, when many attention scenes are detected in a single stock video and many attention marks are displayed on the stock video, the screen becomes complicated. Therefore, the attention scene detector 143 may detect attention scenes so that the interval between attention scenes adjacent in time is T seconds or more, which is set as a predetermined time interval, for each type of attention mark assignment condition, i.e., each type of attention scene, for example.

When the embodiment and modifications set forth above are generalized, the following aspects are obtained.

Aspect 1

A video editing support device, including:
a captured video acquirer that acquires a captured video capturing a state of a sport being played, the captured video including an object as a subject;
a stock video storage unit that stores a stock video based on the captured video;
a condition storage unit that stores multiple attention mark assignment conditions for the object;
an attention scene detector that detects an attention scene that satisfies an attention mark assignment condition in the stock video;
an attention mark assignment unit that relates, to a detected attention scene, an attention mark corresponding to the type of an attention mark assignment condition associated with the detection; and
a stock video display controller that displays the stock video on a predetermined display device and that displays, on the stock video, an attention mark related to an attention scene in the stock video, together with playback time information.

Aspect 2

The video editing support device according to Aspect 1, wherein the attention scene detector detects an attention scene that satisfies an attention mark assignment condition for the type of the captured sport, among the multiple attention mark assignment conditions.

Aspect 3

The video editing support device according to Aspect 1 or 2, wherein the attention scene detector is capable of performing a first detection process of detecting all attention scenes that each satisfy one of the multiple attention mark assignment conditions stored in the condition storage unit, and a second detection process of detecting an attention scene that satisfies a specific attention mark assignment condition among the multiple attention mark assignment conditions stored in the condition storage unit, and the attention scene detector determines which of the detection processes to perform, based on at least one of the capacity of the stock video, the length of the stock video, the processing speed of detecting an attention scene, or an external instruction.

Aspect 4

The video editing support device according to Aspect 1 or 2,
    wherein the attention scene detector detects all attention scenes that each satisfy one of the multiple attention mark assignment conditions stored in the condition storage unit, and
    wherein the stock video display controller displays, on the stock video, only an attention mark related to an attention scene associated with an attention mark assignment condition selected by a user, among the detected attention scenes.

Aspect 5

The video editing support device according to Aspect 1 or 2, wherein the attention scene detector detects only an attention scene that satisfies an attention mark assignment condition selected by a user, among the multiple attention mark assignment conditions stored in the condition storage unit.

Aspect 6

The video editing support device according to any one of Aspects 1 through 5, further including a three-dimensionalization processing unit that generates the stock video by converting the object in the captured video into a three-dimensional object.

Aspect 7

The video editing support device according to any one of Aspects 1 through 6, wherein the attention scene detector detects an attention scene using one of image analysis or posture analysis, depending on the type of the attention mark assignment condition.

Aspect 8

The video editing support device according to any one of Aspects 1 through 7,
    wherein the sport is skateboarding, and
    wherein the object includes a skateboard skater, a board used by a skater, and an obstacle on which a skater slides.

Aspect 9

The video editing support device according to Aspect 8, wherein the multiple attention mark assignment conditions include an attention mark assignment condition associated with a skateboarding trick.

Aspect 10

The video editing support device according to Aspect 8 or 9, wherein the multiple attention mark assignment conditions include an attention mark assignment condition of defining, as an attention scene, a scene in which an evaluation value based on the values of multiple evaluation items for the object is maximum or minimum.

Aspect 11

The video editing support device according to Aspect 10, wherein the multiple evaluation items include a first evaluation item as an evaluation item for the skateboard skater and a second evaluation item as an evaluation item for the board, and the evaluation value is the sum of the value of the first evaluation item and the value of the second evaluation item.

Aspect 12

The video editing support device according to any one of Aspects 1 through 11, wherein the condition storage unit further stores an attention mark assignment condition of defining, as an attention scene, a scene for which each of a predetermined number or more of viewers has shown a predetermined evaluative reaction.

Aspect 13

The video editing support device according to any one of Aspects 9 through 11,
    wherein the condition storage unit further stores an attention mark assignment condition of defining, as an attention scene, a scene for which each of a predetermined number or more of viewers has shown a predetermined evaluative reaction, and
    wherein the attention scene detector treats a predetermined evaluative reaction shown by a viewer viewing the stock video and shown within a predetermined time from the end of a scene in which a trick is performed, as an evaluative reaction to the scene of the trick.

Aspect 14

The video editing support device according to any one of Aspects 1 through 7,
    wherein the sport is a marathon, and
    wherein the object includes a marathon runner.

Aspect 15

The video editing support device according to Aspect 14, wherein the multiple attention mark assignment conditions include an attention mark assignment condition of defining, as an attention scene, a scene in which the values of a first evaluation item and a second evaluation item, both of which are evaluation items for the runner, satisfy a predetermined relationship.

Aspect 16

The video editing support device according to Aspect 15, wherein the predetermined relationship is a relationship in which, in a predetermined time range centered on a time at which the value of the second evaluation item is minimum, the value of the first evaluation item becomes maximum.

Aspect 17

A video editing support method performed by a video editing support device, the video editing support method including:

acquiring a captured video capturing a state of a sport being played, the captured video including an object as a subject;

storing a stock video based on the captured video;

storing multiple attention mark assignment conditions for the object;

detecting an attention scene that satisfies an attention mark assignment condition in the stock video;

relating, to a detected attention scene, an attention mark corresponding to the type of an attention mark assignment condition associated with the detection; and displaying the stock video on a predetermined display device, wherein in the displaying, an attention mark related to an attention scene in the stock video is displayed together with playback time information, on the stock video.

Aspect 18

A computer program causing a computer to implement:

acquiring a captured video capturing a state of a sport being played, the captured video including an object as a subject;

storing a stock video based on the captured video;

storing multiple attention mark assignment conditions for the object;

detecting an attention scene that satisfies an attention mark assignment condition in the stock video;

relating, to a detected attention scene, an attention mark corresponding to the type of an attention mark assignment condition associated with the detection; and displaying the stock video on a predetermined display device and displaying, on the stock video, an attention mark related to an attention scene in the stock video, together with playback time information.

What is claimed is:

1. A video editing support device, comprising:

a captured video acquirer that acquires a captured video capturing a state of a sport being played, the captured video including an object as a subject;

a stock video storage unit that stores a stock video based on the captured video;

a condition storage unit that stores a plurality of attention mark assignment conditions for the object;

an attention scene detector that detects an attention scene that satisfies an attention mark assignment condition in the stock video;

an attention mark assignment unit that relates, to the attention scene detected, an attention mark corresponding to the type of an attention mark assignment condition associated with the detection; and a stock video display controller that displays the stock video on a predetermined display device and that displays, on the stock video, an attention mark related to an attention scene in the stock video, together with playback time information.

2. The video editing support device according to claim 1, wherein the attention scene detector detects an attention scene that satisfies an attention mark assignment condition for the type of the captured sport, among the plurality of attention mark assignment conditions.

3. The video editing support device according to claim 1, wherein the attention scene detector is capable of performing a first detection process of detecting all attention scenes that each satisfy one of the plurality of attention mark assignment conditions stored in the condition storage unit, and a second detection process of detecting an attention scene that satisfies a specific attention mark assignment condition among the plurality of attention mark assignment conditions stored in the condition storage unit, and the attention scene detector determines which of the detection processes to perform, based on at least one of the capacity of the stock video, the length of the stock video, the processing speed of detecting an attention scene, or an external instruction.

4. The video editing support device according to claim 1,
wherein the attention scene detector detects all attention scenes that each satisfy one of the plurality of attention mark assignment conditions stored in the condition storage unit, and
wherein the stock video display controller displays, on the stock video, only an attention mark related to an attention scene associated with an attention mark assignment condition selected by a user, among the detected attention scenes.

5. The video editing support device according to claim 1, wherein the attention scene detector detects only an attention scene that satisfies an attention mark assignment condition selected by a user, among the plurality of attention mark assignment conditions stored in the condition storage unit.

6. The video editing support device according to claim 1, further comprising a three-dimensionalization processing unit that generates the stock video by converting the object in the captured video into a three-dimensional object.

7. The video editing support device according to claim 1, wherein the attention scene detector detects an attention scene using one of image analysis or posture analysis, depending on the type of the attention mark assignment condition.

8. The video editing support device according to claim 1,
wherein the sport is skateboarding, and
wherein the object includes a skateboard skater, a board used by a skater, and an obstacle on which a skater slides.

9. The video editing support device according to claim 8, wherein the plurality of attention mark assignment conditions include an attention mark assignment condition associated with a skateboarding trick.

10. The video editing support device according to claim 8, wherein the plurality of attention mark assignment conditions include an attention mark assignment condition of defining, as an attention scene, a scene in which an evaluation value based on the values of a plurality of evaluation items for the object is greater than or equal to a predetermined threshold or is maximum, or a scene in which the evaluation value is less than or equal to a predetermined threshold or is minimum.

11. The video editing support device according to claim 10, wherein the plurality of evaluation items include a first evaluation item as an evaluation item for the skater and a second evaluation item as an evaluation item for the board, and the evaluation value is the sum of the value of the first evaluation item and the value of the second evaluation item.

12. The video editing support device according to claim 1, wherein the condition storage unit further stores an attention mark assignment condition of defining, as an attention scene, a scene for which each of a predetermined number or more of viewers has shown a predetermined evaluative reaction.

13. The video editing support device according to claim 9, wherein the condition storage unit further stores an attention mark assignment condition of defining, as an attention scene, a scene for which each of a predetermined number or more of viewers has shown a predetermined evaluative reaction, and wherein the attention scene detector treats a predetermined evaluative reaction shown by a viewer viewing the stock video and shown within a predetermined time from the end of a scene in which a trick is performed, as an evaluative reaction to the scene of the trick.

14. The video editing support device according to claim 1, wherein the sport is a marathon, and wherein the object includes a marathon runner.

15. The video editing support device according to claim 14, wherein the plurality of attention mark assignment conditions include an attention mark assignment condition of defining, as an attention scene, a scene in which the values of a first evaluation item and a second evaluation item, both of which are evaluation items for the runner, satisfy a predetermined relationship.

16. The video editing support device according to claim 15, wherein the predetermined relationship is a relationship in which, in a predetermined time range centered on a time at which the value of the second evaluation item is minimum, the value of the first evaluation item becomes maximum.

17. A video editing support method performed by a video editing support device, the video editing support method comprising:

acquiring a captured video capturing a state of a sport being played, the captured video including an object as a subject;

storing a stock video based on the captured video;

storing a plurality of attention mark assignment conditions for the object;

detecting an attention scene that satisfies an attention mark assignment condition in the stock video;

relating, to the attention scene detected, an attention mark corresponding to the type of an attention mark assignment condition associated with the detection; and displaying the stock video on a predetermined display device, wherein in the displaying, an attention mark related to an attention scene in the stock video is displayed together with playback time information, on the stock video.

18. A non-transitory recording medium having embodied thereon a program comprising computer-implemented modules including:

a module that acquires a captured video capturing a state of a sport being played, the captured video including an object as a subject;

a module that stores a stock video based on the captured video;

a module that stores a plurality of attention mark assignment conditions for the object;

a module that detects an attention scene that satisfies an attention mark assignment condition in the stock video;

a module that relates, to a detected attention scene, an attention mark corresponding to the type of an attention mark assignment condition associated with the detection; and a module that displays the stock video on a predetermined display device and displaying, on the stock video, an attention mark related to an attention scene in the stock video, together with playback time information.

* * * * *